United States Patent [19]
Langhals et al.

[11] Patent Number: 6,156,914
[45] Date of Patent: Dec. 5, 2000

[54] DONOR-SUBSTITUTED OXINDIGO DERIVATIVES AND THEIR USE AS COLORANTS

[75] Inventors: Heinz Langhals, Ottobrunn; Barbara Wagner, München, both of Germany

[73] Assignee: Ciba Specialty Chemicals Corporation, Tarrytown, N.Y.

[21] Appl. No.: 09/155,734

[22] PCT Filed: Apr. 25, 1996

[86] PCT No.: PCT/EP97/01915

§ 371 Date: Oct. 5, 1998

§ 102(e) Date: Oct. 5, 1998

[87] PCT Pub. No.: WO97/41176

PCT Pub. Date: Nov. 6, 1997

[30] Foreign Application Priority Data

Apr. 25, 1996 [DE] Germany .......................... 196 16 532

[51] Int. Cl.$^7$ ................................................. C07D 307/02
[52] U.S. Cl. ........................................................... 549/479
[58] Field of Search .................... 549/295, 313, 549/479

[56] References Cited

U.S. PATENT DOCUMENTS 4,212,823  7/1980  Müller ..................................... 260/571

FOREIGN PATENT DOCUMENTS 61-179791  12/1986  Japan .
61-180237  12/1986  Japan .
07150136   6/1994  Japan .

OTHER PUBLICATIONS

Smith et al., J. of the Amer. Chem. Soc., vol. 73, pp. 4294–4297 (1951).
Chem. Abstracts, vol. 23, pp. 1278–1279 (1929) of German patent 469,178 filed Oct. 22, 1926.
Fries et al., Berichte Der Deutschen Chemischen Gesellschaft, vol. 54, No. 2, pp. 293–296 (1921).
Fries et al., Justus Liebigs Annalen Der Chemie, vol. 442, pp. 284–300 (1925).
Fries et al., Justus Liebigs Annalen Der Chemie, vol. 405, pp. 365–372 (1914).
Ruhemann, Journal of the Chem. Soc., vol. 83, pp. 1130–1135 (1903).
Artico et al., Biochemical Pharmcology, vol. 17, pp. 873–882 (1968).
Skinner et al., Journal of Organic Chemistry, vol. 26, pp 152–155 (1961).
Kimachi et al., Journal of the Heterocyclic Chemistry, vol. 26, pp. 1255–1259 (1989).
Valenta et al., Journal of the American Chemical Society, vol. 86, pp. 2533–2534 (1964).
Crossley et al., Journal of the American Chemical Society, vol. 74, No. 3, pp. 573–578 (1952).
Umemoto et al., Chemical Abstracts, vol. 73, No. 26, p. 47, col. 1 (1970).
Langhal et al., Angew. Chem., vol. 108, pp 1090–1093 (1996).
Fries et al., Chem Ber., vol. 54, pp 2931–34 (1921).
Garcia et al., Org. Mass Spectrometry, vol. 24(6), pp. 429–430 (1989).
Fries et al., Ber. Dtsch. Chem. Ges., vol. 44, pp. 124–128 (1911).
Gusten, Chemical Communications, pp. 133–134 (1969).

*Primary Examiner*—Amelia Owens
*Attorney, Agent, or Firm*—David R. Crichton

[57] ABSTRACT

Oxindigo derivative (1 and 2) in which four to seven of the radicals shown are hydrogen and one to four of these radicals are a radical chosen from the group consisting of a carbocyclic radical, a heterocyclic radical, halogen, $C_1$–$C_{18}$alkyl, —$OR^{12}$, —CN, —$NR^{10}R^{11}$, —$COR^9$, —$NR^{13}COR^9$, —$NR^{12}COOR^9$, —$NR^{12}CONR^{10}R^{11}$, —$NHSO_2R^9$, —$SO_2R^9$, —$SOR^9$, —$SO_2OR^9$, —$CONR^{10}R^{11}$, —$SO_2NR^{10}R^{11}$, —N=$NR^{14}$, —$OCOR^9$ and —$OCONHR^9$, wherein two corresponding adjacent radicals can be combined to build up fused-on aromatic rings, in which $R^9$ is $C_1$–$C_{18}$alkyl, $C_6$–$C_{10}$aryl, benzyl or a heterocyclic radical, $R^{10}$ and $R^{11}$ are hydrogen, $C_1$–$C_{18}$alkyl, $C_3$- to $C_{24}$cycloalkyl, $C_6$–$C_{10}$aryl or heteroaryl or in which $R^{10}$ and $R^{11}$, together with in each case one of the other radicals $R_2$ to $R_4$, form a ring, $R^{12}$ is hydrogen, $C_1$–$C_{18}$alkyl, $C_3$- to $C_{24}$cycloalkyl, $C_6$–$C_{10}$aryl or a heteroaryl, $R^{13}$ is hydrogen, $C_1$–$C_{18}$alkyl, $C_3$- to $C_{24}$cycloalkyl, $C_1$–$C_4$alkylaryl, $C_6$–$C_{10}$aryl or a heterocyclic radical and $R^{14}$ is the radical of a coupling component or $C_6$–$C_{10}$aryl, and a process for their preparation, their use and intermediates.

6 Claims, No Drawings

DONOR-SUBSTITUTED OXINDIGO DERIVATIVES AND THEIR USE AS COLORANTS

The present invention relates to oxindigo derivatives of the general formulae 1 and 2

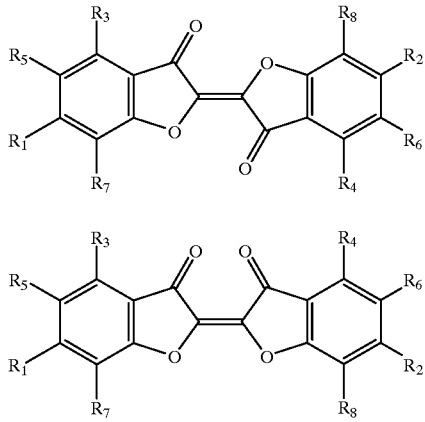

in which four to seven of the radicals $R_1$, $R_2$, $R_3$, $R_4$, $R_5$, $R_6$, $R_7$ and $R_8$ are hydrogen and one to four of these radicals is or are a radical chosen from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{12}$, —CN, —$NR^{10}R^{11}$, —$COR^9$, —$NR^{13}COR^9$, —$NR^{12}COOR^9$, —$NR^{12}CONR^{10}R^{11}$, —$NHSO_2R^9$, —$SO_2R^9$, —$SOR^9$, —$SO_2OR^9$, —$CONR^{10}R^{11}$, —$SO_2NR^{10}R^{11}$, —N=$NR^{14}$, —$OCOR^9$ and —$OCONHR^9$, wherein two corresponding adjacent radicals can be combined to build up fused-on aromatic rings, in which $R^9$ is $C_1$–$C_{18}$alkyl, $C_6$–$C_{10}$aryl or benzyl which is unsubstituted or substituted by halogen, $C_1$–$C_4$alkyl or $C_1$–$C_4$alkoxy, or a five- to seven-membered heterocyclic radical, $R^{10}$ and $R^{11}$ independently of one another are hydrogen, $C_1$–$C_{18}$alkyl which is unsubstituted or substituted by cyano or hydroxy groups, $C_3$– to $C_{24}$cycloalkyl, $C_6$–$C_{10}$aryl or 5- to 7-membered heteroaryl, or in which $R^{10}$ and $R^{11}$, together with in each case one of the other radicals $R_2$ to $R_4$, form a 5- or 6-membered carbocyclic or heterocyclic ring, $R^{12}$ is hydrogen, $C_1$–$C_{18}$alkyl, $C_3$– to $C_{24}$cycloalkyl, $C_6$–$C_{10}$aryl or 5- to 7-membered heteroaryl, $R^{13}$ is hydrogen, $C_1$–$C_{18}$alkyl which is unsubstituted or substituted by cyano, hydroxy or $C_1$–$C_4$alkyoxycarbonyl groups, $C_3$– to $C_{24}$cycloalkyl, $C_1$–$C_4$alkylaryl, $C_6$–$C_{10}$aryl which is unsubstituted or substituted by halogen, $C_1$–$C_4$alkyl- or $C_1$–$C_4$alkoxy groups, or a 5 to-7-membered heterocyclic radical, and $R^{14}$ is the radical of a coupling component or is $C_6$–$C_{10}$aryl which is unsubstituted or substituted by halogen, $C_1$–$C_4$alkyl or $C_1$–$C_4$alkoxy groups, and mixtures of the oxindigo derivatives 1 and 2, with the proviso that in the oxindigo derivatives 1 (transform) $R_1$ and $R_2$ are not simultaneously methyl or methoxy, or $R_5$ and $R_6$ are not simultaneously chlorine, or $R_1$, $R_2$, $R_3$ and $R_4$ are not simultaneously methyl, or $R_1$, $R_2$, $R_5$, $R_6$, $R_7$ and $R_8$ are not simultaneously methyl, if in each case all the other radicals from the list of $R_1$ to $R_8$ are hydrogen, and with the further proviso that if $R_1$ in the cis-oxindigo derivative 2 is a dimethylamino group, $R_2$ is not simultaneously a hydroxy group.

The invention furthermore relates to a process for the preparation of the compounds according to the invention, their use as colorants and intermediates.

Oxindigo

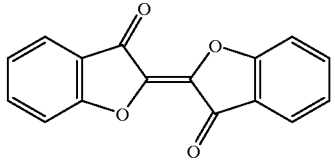

(cf. for example Ber.Dtsch.Chem.Ges. 44 (1911) 124–128), as a chromophoric system, has not acquired any industrial importance at all as a colorant, in contrast to its nitrogen analog indigo or the sulfur analog thioindigo. The reason for this is, inter alia, that oxindigo absorbs at a very short wavelength (413 nm in cyclohexane, cf. J.Chem.Soc. D 1969, 133–134), has a relatively low extinction coefficient (13800, ibid.), is not fluorescent, has a relatively low stability and, furthermore, is also difficult to prepare.

Methyl- and methoxy-substituted compounds, which can be non-brominated or brominated, dichlorinated compounds, dibenzo-substituted compounds and derivatives with a $C(O)O(CH_2)_2)OMe$ radical and two —$C_{18}H_{37}$— radicals are known from Justus Liebigs Ann. Chem. 405 (1914) 365, 372; Justus Liebigs Ann.Chem. 442 (1925) 263, 278, 284–300; J. Amer. Chem. Soc. 73 (1951) 4294, 4297; Chem.Ber. 54 (1921) 2933; Org.Mass.Spectrom. 24(6) (1989) 429–430; JP-A 61180237; JP-A 61179791 and JP-A 07150136 (Toyo Ink).

The unsymmetrically substituted cis compound described in JP-A 07150136

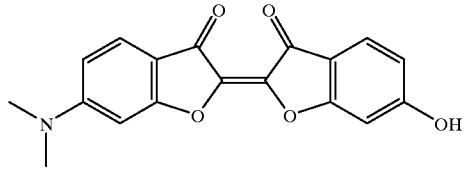

shows only electroluminescent, properties. Further, no disclosure with regard to its preparation is given.

J.Phys.Chem. 77 (1973) 831–837 describes the effect of fluorescence quenching when donor groups are introduced into positions 6 and 6' in thioindigo by substitution. On the basis of similar properties between oxygen and sulfur no, or no good, fluorescence properties were therefore to be expected from the homologous oxindigo compounds.

Furthermore, syntheses known to date are either multi-stage syntheses and correspondingly expensive due to isolation of the respective intermediates (cf. Justus Liebigs Ann.Chem. 442 (1925) 284–300, Ber.Dtsch.Chem.Ges. 44 (1911) 124–128 and Ber.Dtsch.Chem.Ges. 42 (1909) 199–202), or the synthesis proposal as described in Bull.Soc.Chim.France 11 (1944) 82–89 does not lead to the desired oxindigo derivatives at all (cf. Tetrahedron Lett. 1976, 3519–3522).

The object of the present invention was therefore to provide oxindigo derivatives which do not have the above-mentioned disadvantages. In particular, colorants were to be provided for the visible region, preferably with fluorescent properties, particularly preferably with fluorescence of the solid. Furthermore, an improved process was to be provided which enables oxindigo and derivatives thereof to be prepared without isolation of any intermediates. Furthermore, oxindigo derivatives having improved extinction coefficients, higher quantum yields and better photochemical stabilities and colorants based on oxindigo derivatives for use as vat dyes, dye lasers and fluorescence markers were to be provided.

The oxindigo derivatives 1 and 2 according to the invention have accordingly been found.

A process has furthermore been found for their preparation and their use has been found for the preparation of vat dyes, dye lasers and fluorescence markers.

Unless noted otherwise, the following statements always relate to the trans (1) and the cis (2) oxindigo derivatives.

According to the invention, four to seven of the radicals $R_1$, $R_2$, $R_3$, $R_4$, $R_5$, $R_6$, $R_7$ and $R_8$ are hydrogen and one to four of these radicals are chosen from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{12}$, —CN, —$NR^{10}R^{11}$, —$COR^9$, —$NR^{13}COR^9$, —$NR^{12}COOR^9$, —$NR^{12}CONR^{10}R^{11}$, —$NHSO_2R^9$, —$SO_2R^9$, —$SOR^9$, —$SO_2OR^9$, —$CONR^{10}R^{11}$, —$SO_2NR^{10}R^{11}$, —N=$NR^{14}$, —$OCOR^9$ and —$OCONHR^9$, wherein two corresponding adjacent radicals can be combined to build up fused-on aromatic rings, in which $R^9$ is $C_1$–$C_{18}$alkyl, $C_6$–$C_{10}$aryl or benzyl which is unsubstituted or substituted by halogen, $C_1$–$C_4$alkyl or $C_1$–$C_4$alkoxy, or a five- to seven-membered heterocyclic radical, $R^{10}$ and $R^{11}$ independently of one another are hydrogen, $C_1$–$C_{18}$-alkyl which is unsubstituted or substituted by cyano or hydroxy groups, $C_3$- to $C_{24}$cycloalkyl, $C_6$–$C_{10}$aryl or 5- to 7-membered heteroaryl, or in which $R^{10}$ and $R^{11}$, together with in each case one of the other radicals $R_2$ to $R_4$, form a 5- or 6-membered carbocyclic or heterocyclic ring, $R^{12}$ is hydrogen, $C_1$–$C_{18}$alkyl, $C_3$- to $C_{24}$cycloalkyl, $C_6$–$C_{10}$aryl or 5- to 7-membered heteroaryl, $R^{13}$ is hydrogen, $C_1$–$C_{18}$alkyl which is unsubstituted or substituted by cyano, hydroxy or $C_1$–$C_4$alkoxycarbonyl groups, $C_3$- to $C_{24}$cycloalkyl, $C_1$–$C_4$alkylaryl, $C_6$–$C_{10}$aryl which is unsubstituted or substituted by halogen or $C_1$–$C_4$alkyl or $C_1$–$C_4$alkoxy groups, or a 5 to 7-membered heterocyclic radical, and $R^{14}$ is the radical of a coupling component or is $C_6$–$C_{10}$aryl which is unsubstituted or substituted by halogen, $C_1$–$C_4$alkyl or $C_1$–$C_4$alkoxy groups, and mixtures of the oxindigo derivatives 1 and 2, with the proviso that in the oxindigo derivatives 1 (trans form) $R_1$ and $R_2$ are not simultaneously methyl or methoxy, or $R_5$ and $R_6$ are not simultaneously chlorine, or $R_1$, $R_2$, $R_3$ and $R_4$ are not simultaneously methyl, or $R_1$, $R_2$, $R_5$, $R_6$, $R_7$ and $R_8$ are not simultaneously methyl, if in each case all the other radicals from the list of $R_1$ to $R_8$ are hydrogen, and with the further proviso that if $R_1$ in the cis-oxindigo derivative 2 is a dimethylamino group, $R_2$ is not simultaneously a hydroxy group.

The unsubstituted or substituted carbocyclic aromatic radical chosen is preferably a mono- to tetracyclic, particularly preferably mono- or bicyclic radical having five to seven carbon atoms per ring, such as phenyl, diphenyl and naphthyl.

The unsubstituted or substituted heterocycloc aromatic radical is preferably a mono- to tricyclic radical having preferably five to seven ring atoms. This radical can comprise only at least one hetercyclic ring, or the heterocyclic ring or rings can contain at least one fused-on benzene ring. Examples are pyridyl, pyrimidyl, pyrazinyl, triazinyl, furanyl, pyrrolyl, thiophenyl, quinolyl, isoquinolyl, coumarinyl, benzofuranyl, benzimidazolyl, benzoxazolyl, dibenzfuranyl, benzothiophenyl, dibenzothiophenyl, indolyl, carbazolyl, pyrazolyl, imidazolyl, oxazolyl, isoxazolyl, thiazolyl, indazolyl, benzothiazolyl, pyridazinyl, cinnolyl, quinazolyl, quinoxalyl, phthalazinyl, phthalazindionyl, phthalimidyl, chromonyl, naphtholactamyl, benzopyridonyl, ortho-sulfobenimidyl, maleinimidyl, naphtharidinyl, benzimidazolonyl, benzoxazolonyl, benzothiazolonyl, benzothiazolinyl, quinazolonyl, pyrimidyl, quinoxalonyl, phthalazonyl, dioxapyrinidinyl, pyridonyl, isoquinolonyl, isothiazolyl, benzisoxazolyl, benzisothiazolyl, indazolonyl, acridinyl, acridonyl, quinazolindionyl, benzoxazindionyl, benzoxazinonyl and phthalimidyl.

Each two of adjacent radicals like $R_3$ and $R_5$, $R_5$ and $R_1$, $R_1$ and $R_7$ etc. jointly can build a carbocyclic or heterocyclic radical, thus fused-on or condensed ringsystems are claimed, too. Preferably the abovementioned radicals are chosen as fused-on ringsystems.

In a preferred embodiment the carbocyclic and/or heterocyclic aromatic radicals are mono- or polysubstituted by customary substituents, particularly preferably by substitutents which do not render them water-soluble: Examples are:

halogen such as fluorine, chlorine, bromine and iodine, preferably chlorine;

the cyano group —CN;

unsubstituted or substituted $C_1$–$C_{18}$alkyl, such as methyl, ethyl, n-propyl, isopropyl, n-butyl, i-butyl, sec-butyl, tert-butyl, tert-amyl, n-hexyl, 1,1,3,3,-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl and 3-undecyl, preferably $C_1$–$C_{12}$alkyl, such as methyl, ethyl, n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6 -undecyl, 7-tridecyl, 3-hexyl, 3-heptyl, 3-nonyl and 3-undecyl, particularly preferably $C_1$–$C_8$alkyl, such as methyl, ethyl, n-propyl, isopropyl, n-butyl, i-butyl, sec-butyl, tert-butyl, tert-amyl, n-hexyl, 1,1,3,3,-tetramethylbutyl, n-heptyl, n-octyl, 3-pentyl, 4-heptyl, 3-hexyl and 3-heptyl, especially preferably $C_1$–$C_4$alkyl, such as methyl, ethyl, n-propyl, isopropyl, n-butyl, i-butyl, sec-butyl and tert-butyl;

it being possible for the alkyl groups mentioned to be substituted by the following groups, which as a rule do not increase the hydrophilicity, such as fluorine, cyano; —$OCOR^9$, —$OR^{10}$, —$OCOOR^9$, —$CON(R^{10})(R^{11})$ or —$OCONHR^9$, in which $R^9$ is $C_1$–$C_{18}$alkyl, such as methyl, ethyl, n-propyl, isopropyl, n-butyl, i-butyl, sec-butyl, tert-amyl, n-hexyl, 1,1,3,3,-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl or 3-undecyl, preferably $C_1$–$C_{12}$alkyl, such as methyl, ethyl, n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6-undecyl, 7-tridecyl, 3-hexyl, 3-heptyl, 3-nonyl or 3-undecyl, $C_6$–$C_{10}$aryl, such as phenyl and naphthyl, preferably naphthyl, or benzyl which is unsubstituted or substituted by halogen, such as chlorine and fluorine, preferably fluorine, $C_1$–$C_4$alkyl or —O—$C_1$–$C_4$alkyl, or a five- to seven-membered heterocyclic radical, such as pyridyl, pyrimidyl, pyrazinyl, triazinyl, furanyl, pyrrolyl, thiophenyl, quinolyl, isoquinolyl or coumarinyl, and $R^{10}$ and $R^{11}$ are hydrogen, $C_1-C_{18}$alkyl as defined above, preferably $C_1-C_{12}$alkyl, particularly preferably $C_1-C_8$alkyl, especially preferably $C_1-C_4$alkyl as defined above, which is unsubstituted or substituted by the cyano or hydroxy groups, $C_3$- to $C_{24}$cycloalkyl, preferably $C_5$-, $C_6$-, $C_{12}$-, $C_{15}$-, $C_{16}$-, $C_{20}$- and $C_{24}$cycloalkyl, aryl or heteroaryl, preferably derived from one of the carbo- and heterocyclic aromatic radicals defined above, in particular phenyl which is unsubstituted or substituted by halogen, $C_1-C_4$alkyl or $C_1-C_4$alkoxy, or in which $R^{10}$ and $R^{11}$, together with in each sase one of the other radicals $R^2$ to $R^4$, form a 5- to 6-membered ring or else a hetero ring, for example a pyridine, pyrrole, furan or pyran ring, preferred radicals —$OR^{10}$ are hydroxy, —O-methyl, —O-ethyl, —O-i-propyl, —O-i-butyl, —O-phenyl, —O-2,5-di-tert.-butylphenyl, preferred radicals —$CON(R^{10})(R^{11})$ are —$CONH_2$, —$CONMe_2$, —$CONEt_2$, —$CON(iPr)_2$, —$CON(i-Bu)_2$, —$CONPh_2$, —$CON(2,5$-di-tert.-butylphenyl$)_2$.

In another preferred embodiment, mono- or dialkylated amino groups, aryl radicals, such as naphthyl or, in particular, phenyl which is unsubstituted or substituted by halogen, alkyl or —O-alkyl, or furthermore heterocyclic aromatic radicals, such as 2-thienyl, 2-benzoxazolyl, 2-benzothiazolyl, 2-benzimidazolyl, 6-benzimidazolonyl, 2-, 3- or 4-pyridinyl, 2-, 4- or 6-quinolyl or 1-, 3-, 4-, 6- or 8-isoquinolyl radicals, are used on the alkyl groups.

If the substituents mentioned in their turn again contain alkyl, this alkyl can be branched or unbranched and can preferably contain 1 to 18, in particular 1 to 12, especially 1 to 8, and particularly preferably 1 to 4 C atoms. Examples of unsubstituted alkyl groups are methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl and 3-undecyl, and examples of substituted alkyl groups are hydroxymethyl, 2-hydroxyethyl, trifluoromethyl, trifluoroethyl, cyanomethyl, methoxycarbonylmethyl, acetoxymethyl or benzyl.

—$OR^{12}$, in which $R^{12}$ is hydrogen, $C_1-C_{18}$alkyl as defined for $R^9$, including the preferred variants defined there, $C_3$- to $C_{24}$cycloalkyl, particularly preferably $C_5$-, $C_6$-, $C_{12}$-, $C_{15}$-, $C_{16}$-, $C_{20}$- and $C_{24}$cycloalkyl, $C_6-C_{10}$aryl, such as naphthyl and phenyl, preferably unsubstituted phenyl and phenyl which is substituted by halogen, $C_1-C_4$alkyl or $C_1-C_4$alkoxy, or 5- to 7-membered heteroaryl. Examples of preferred radicals $R^{12}$ are: methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, hydroxymethyl, 2-hydroxyethyl, trifluoromethyl, trifluoroethyl, cyanomethyl, methoxycarbonylmethyl, acetoxymethyl, benzyl, phenyl, o-, m- or p-chlorophenyl, o-, m- or p-methylphenyl, 1- or 2-naphthyl, cyclopentyl, cyclohexyl, cyclododecyl, cyclopentadecyl, cyclohexadecyl, cycloeicosanyl, cyclotetracosanyl, thienyl and pyranylmethyl; preferred radicals —$OR^{12}$ are hydroxy, methoxy, —O-ethyl, —O-i-propyl, —O-i-butyl, —O-phenyl, —O-2,5-di-tert.-butylphenyl.

—$NR^{10}R^{11}$, in which $R^{10}$ and $R^{11}$ are as defined above. Examples of preferred radicals are: amino, methylamino, dimethylamino, ethylamino, diethylamino, isopropylamino, 2-hydroxyethylamino, 2-hydroxypropylamino, N,N-bis(2-hydroxyethyl)amino, cyclopentylamino, cyclohexylamino, cyclododecylamino, cyclopentadecylamino, cyclohecadecylamino, cycloeicosanylamino, cyclotetracosanylamino, phenylamino, N-methylphenylamino, benzylamino, dibenzylamino, piperidyl or morpholyl;

—$COR^9$, in which $R^9$ is as defined above. Examples of preferred radicals $R^9$ are: methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, hydroxymethyl, 2-hydroxyethyl, trifluoromethyl, trifluoroethyl, cyanomethyl, methoxycarbonylmethyl, acetoxymethyl, benzyl, phenyl, o-, m- or p-chlorophenyl, o-, m-, or p-methylphenyl, 1- or 2-naphthyl, cyclopentyl, cyclohexyl, cyclododecyl, cyclopentadecyl, cyclohexadecyl, cycloeicosanyl, cyclotetracosanyl, thienyl, pyranylmethyl and furfuryl;

—$NR^{13}COR^9$, in which $R^9$ is as defined above and $R^{13}$ is hydrogen, $C_1-C_{18}$alkyl which is unsubstituted or substituted by cyano, hydroxy or $C_1-C_4$alkoxycarbonyl groups, $C_3$- to $C_{24}$cycloalkyl, $C_1-C_4$alkylaryl, $C_6-C_{10}$aryl which is unsubstituted or substituted by halogen or $C_1-C_4$alkyl or $C_1-C_4$alkoxy groups, or a 5- to 7-membered heterocyclic radical, the individual radicals such as alkyl, alkoxy, aryl and the like being as defined above for these radicals, including the preferred ranges defined there. Examples of radicals are: acetylamino, propionylamino, butyrylamino, benzoylamino, p-chlorobenzoylamino, p-methylbenzoylamino, N-methylacetamino, N-methylbenzoylamino, N-succinimido, N-phthalimido or N-(4-amino)phthalimido;

—$NR^{12}COOR^9$, in which $R^9$ and $R^{12}$ are as defined above. Examples of radicals are: —$NHCOOCH_3$, —$NHCOOC_2H_5$ and —$NHCOOC_6H_5$;

—$NR^{12}CONR^{10}R^{11}$, in which $R^{10}$, $R^{11}$ and $R^{12}$ are as defined above. Examples of radicals are: ureido, N-methylureido, N-phenylureido, or N,N'-2',4'-dimethylphenylureido;

—$NHSO_2R^9$, in which $R^9$ is as defined above. Examples of radicals are: methylsulfonylamino, phenylsulfonylamino, p-tolylsulfonylamino or 2-naphthylsulfonylamino;

—$SO_2R^9$, in which $R^9$ is as defined above. Examples of radicals are: methylsulfonyl, ethylsulfonyl, phenylsulfonyl and 2-naphthylsulfonyl;

—$SOR^9$, in which $R^9$ is as defined above. An example of the radical is phenylsulfoxidyl;

—$SO_2OR^9$, in which $R^9$ is as defined above. Examples of radicals $R^9$ are: methyl, ethyl, phenyl, o-, m-, or p-chlorophenyl, o-, m-, or p-methylphenyl or 1- or 2-naphthyl;

—$CONR^{10}R^{11}$, in which $R^{10}$ and $R^{11}$ are as defined above. Examples of radicals are: carbamoyl, N-methylcarbamoyl, N-ethylcarbamoyl, N-phenylcarbamoyl, N,N-dimethylcarbamoyl, N-methyl-N-phenylcarbamoyl, N-1-naphthylcarbamoyl or N-piperidylcarbamoyl;

—$SO_2NR^{10}R^{11}$, in which $R^{10}$ and $R^{11}$ are as defined above. Examples of radicals are: sulfamoyl, N-methylsulfamoyl, N-ethylsulfamoyl, N-phenylsulfamoyl, N-methyl-N-phenylsulfamoyl or N-morpholylsulfamoyl;

—$N=NR^{14}$, in which $R^{14}$ is the radical of a coupling component or a phenyl radical which is unsubstituted or substituted by halogen, alkyl or —O-alkyl, where halogen and alkyl are as defined above. Alkyl in the definition of $R^{14}$ can have a number of C atoms defined above as preferred. Examples of $R^{14}$ are: the acetoacetarylide, pyrazolyl, pyridonyl, o- or p-hydroxyphenyl, o-hydroxynaphthyl, p-aminophenyl or p-N,N-dimethylaminophenyl radicals.

—$OCOR^9$, in which $R^9$ is as defined above. Examples of radicals $R^9$ are: methyl, ethyl, phenyl and o-, m- or p-chlorophenyl;

—$OCONHR^9$, in which $R^9$ is as defined above. Examples of radicals $R^9$ are: methyl, ethyl, phenyl and o-, m- or p-chlorophenyl.

Halogen can be fluorine, chlorine, bromine and iodine, preferably fluorine and chlorine, and preferably at least one of the following radicals $R_1$, $R_2$, $R_3$, $R_4$, $R_7$ and $R_8$ is fluorine, chlorine or bromine, and particularly preferably $R_1$ and $R_2$ are simultaneously chlorine.

Unsubstituted or substituted $C_1$–$C_{18}$alkyl can be methyl, ethyl, n-propyl, isopropyl, n-butyl, i-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl or 3-undecyl, preferably $C_1$–$C_{12}$alkyl, such as methyl, ethyl, n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6-undecyl, 7-tridecyl, 3-hexyl, 3-heptyl, 3-nonyl or 3-undecyl, particularly preferably $C_1$–$C_8$alkyl, such as methyl, ethyl, n-propyl, isopropyl, n-butyl, i-butyl, sec-butyl, tert-butyl, tert-amyl, n-hexyl, 1,1,3,3-tetramethylbutyl, n-heptyl, n-octyl, 3-pentyl, 4-heptyl, 3-hexyl or 3-heptyl, especially preferably $C_1$–$C_4$alkyl, such as methyl, ethyl, n-propyl, isopropyl, n-butyl, i-butyl sec-butyl or tert-butyl;

it being possible for the alkyl groups defined to be substituted by the following groups, which as a rule do not increase the hydrophilicity, such as fluorine, hydroxy, cyano, —$OCOR^9$, —$OR^{10}$, —$OCOOR^9$, —$CON(R^{10})(R^{11})$ or —$OCONHR^9$, in which $R^9$ is $C_1$–$C_{18}$alkyl, such as methyl, ethyl, n-propyl, isopropyl, n-butyl, i-butyl, sec-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl or 3-undecyl, preferably $C_1$–$C_{12}$alkyl, such as methyl, ethyl n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6-undecyl, 7-tridecyl, 3-hexyl, 3-heptyl, 3-nonyl or 3-undecyl, $C_6$–$C_{10}$aryl, such as phenyl and naphthyl, preferably naphthyl, or benzyl which is unsubstituted or substituted by halogen, such as chlorine and fluorine, preferably fluorine, $C_1$–$C_4$alkyl or —O—$C_1$–$C_4$alkyl, or a five- to seven-membered heterocyclic radical, such as pyridyl, pyrimidyl, pyrazinyl, triazinyl, furanyl, pyrrolyl, thiophenyl, quinolyl, isoquinolyl or coumarinyl, and $R^{10}$ and $R^{11}$ are hydrogen, $C_1$–$C_{18}$alkyl as defined above, preferably $C_1$–$C_{12}$alkyl, particularly preferably $C_1$–$C_8$alkyl, especially preferably $C_1$–$C_4$alkyl as defined above, which is unsubstituted or substituted by the cyano or hydroxy groups, $C_3$- to $C_{24}$cycloalkyl, preferably $C_5$-, $C_6$-, $C_{12}$-, $C_{15}$-, $C_{16}$-, $C_{20}$- and $C_{24}$cycloalkyl, aryl or heteroaryl, preferably derived form one of the carbo- and heterocyclic aromatic radicals defined above, in particular phenyl which is unsubstituted or substituted by halogen, $C_1$–$C_4$alkyl or $C_1$–$C_4$alkoxy, or in which $R^{10}$ and $R^{11}$, together with in each case one of the other radicals $R^2$ to $R^4$, form a 5- to 6-membered ring or else a hetero ring, for example a pyridine, pyrrole, furan or pyran ring.

In another preferred embodiment, mono- or dialkylated amino groups, aryl radicals, such as naphthyl or, in particular, phenyl which is unsubstituted or substituted by halogen, alkyl or —O-alkyl, or furthermore heterocyclic aromatic radicals, such as 2-thienyl, 2-benzoxazolyl, 2-benzothiazolyl, 2-benzimidazolyl, 6-benzimidazolonyl, 2-, 3- or 4-pyridinyl, 2-, 4- or 6-quinolyl or 1-, 3-, 4-, 6- or 8-isoquinolyl radicals are used on the alkyl groups.

If the substitutents mentioned in their turn again contain alkyl, this alkyl can be branched or unbranched and can preferably contain 1 to 18, in particular 1 to 12, especieally 1 to 8, and particularly preferably 1 to 4 C atoms. Examples of unsubstituted alky groups are methyl, ethyl, n-propyl, isopropyl, n-butyl, sec-butyl, tert-butyl, tert-amyl, n-hexyl, 1,1,3,3-tetramethylbutyl, n-heptyl n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl and 3-undecyl, and examples of substituted alkyl groups are hydroxymethyl, 2-hydroxyethyl, trifluoromethyl, trifluoroethyl, cyanomethyl, methoxycarbonylmethyl, acetoxymethyl or benzyl.

In a preferred embodiment, $R_1$ and $R_2$ are simultaneously, independently of the choice of the other radicals within the present definition of the radicals $R_1$ to $R_8$, $C_4$–$C_{18}$alkyl such as n-butyl, i-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, preferably $C_6$–$C_{12}$alkyl such as n-hexyl, n-heptyl, n-octyl, n-nonyl, n-decyl, n-undecyl, n-dodecyl, 4-heptyl, 5-nonyl, 6-undecyl, 7-tridecyl, 3-hexyl, 3-heptyl, 3-nonyl, 3-undecyl, in which case these alkyl radicals may be substituted by the groups described above which do not generally increase the hydrophilicity.

In the radical —$OR^{12}$, $R^{12}$ can be: hydrogen, $C_1$–$C_{18}$alkyl as defined for $R^9$, including the preferred variants defined there, where, if $R_1$=$R_2$ are in each case the same alkoxy radical, independently of the choice of the other radicals within the present definition of the radicals $R_1$ to $R_8$, the radical chosen for $R_1$ and $R_2$ is preferably $C_4$–$C_{18}$alkyl, such as n-butyl, i-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl and 3-undecyl, particularly preferably $C_6$–$C_{12}$alkyl, such as n-hexyl, n-heptyl, n-octyl, n-nonyl, n-decyl, n-undecyl, n-dodecyl, 4-heptyl, 5-nonyl, 6-undecyl, 7-tridecyl, 3-hexyl, 3-heptyl, 3-nonyl, 3-undecyl, or is $C_3$- to $C_{24}$cycloalkyl, particularly preferably $C_5$-, $C_6$-, $C_{12}$-, $C_{15}$-, $C_{16}$-, $C_{20}$- and $C_{24}$cycloalkyl, $C_6$–$C_{10}$aryl, such as naphthyl and phenyl, preferably unsubstituted phenyl and phenyl which is substituted by halogen, $C_1$–$C_4$alkyl or $C_1$–$C_4$alkoxy, or 5- or 7-membered heteroaryl. Examples of preferred radicals $R^{12}$ are: methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, hydroxymethyl, 2-hydroxyethyl, trifluoromethyl, trifluoroethyl, cyanomethyl, methoxycarbonylmethyl, acetoxymethyl, benzyl, phenyl, o-, m- or p-chlorophenyl, o-, m-, or p-methylphenyl, 1- or 2-naphthyl, cyclopentyl, cyclohexyl, cyclododecyl, cyclopentadecyl, cyclohexadecyl, cycloeicosanyl, cyclotetracosanyl, thienyl and pyranylmethyl. Examples of preferred radicals are hydroxyl, methoxy, —O-ethyl, —O-i-propyl, —O-i-butyl, —O-phenyl, —O-2,5-di-tert-butylphenyl.

In —$NR^{10}R^{11}$, $R^{10}$ and $R^{11}$ can be the radicals defined above. Examples of preferred radicals are: amino, methylamino, dimethylamino, ethylamino, diethylamino, isopropylamino, 2-hydroxyethylamino, 2-hydroxypropylamino, N,N-bis(2-hydroxyethyl)amino, cyclopentylamino, cyclohexylamino, cyclododecylamino, cyclopentadecylamino, cyclohecadecylamino, cycloeicosanylamino, cyclotetracosanylamino, phenylamino, N-methylphenylamino, benzylamino, dibenzylamino, piperidyl or morpholyl, and dimethylamino, diethylamino and di-n-propylamino, di-n-butylamino, di-n-pentylamino, di-n-hexylamino, di-n-heptylamino, di-n-octylamino and di-n-dodecylamino are particularly preferred.

$R^{10}$ and $R^{11}$, by themselves or together with in each case at least one of the other free radicals from the list $R_1$, $R_3$, $R_5$, $R_7$ or $R_2$, $R_4$, $R_6$, $R_8$, can form one or more five- or six-membered, saturated or unsaturated rings, such as pyridine, pyrrole, piperidine, quinoline or benzoquinolizine derivatives. An example is: Δ11,11'(2H,3H,4H,6H,7H,8H, 10H,2'H,3'H,4'H,6'H,7'H,8'H,10'H)-bibenzo[i,j]furo[3,2-g]-quinoline-10,10'-dione.

In a preferred embodiment, the radicals $R_1$ to $R_8$ are chosen such that the oxindigo derivatives 1 and 2 according to the invention have at least two, preferably two, three or four, particularly preferably two, radicals —$NR^{10}R^{11}$, the remainder of the radicals $R_1$ to $R_8$ particularly preferably being hydrogen.

—$COR^9$ can be those radicals in which $R^9$ is as defined above. Examples of preferred radicals $R^9$ are: methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, hydroxymethyl, 2-hydroxyethyl, trifluoromethyl, trifluoroethyl, cyanomethyl, methoxycarbonylmethyl, acetoxymethyl, benzyl, phenyl, o-, m- or p-chlorophenyl, o-, m-, or p-methylphenyl, 1- or 2-naphthyl, cyclopentyl, cyclohexyl, cyclododecyl, cyclopentadecyl, cyclohexadecyl, cycloeicosanyl, cyclotetracosanyl, thienyl, pyranylmethyl and furfuryl.

—$NR^{13}COR^9$ can be those radicals in which $R^9$ is as defined above and $R^{13}$ is hydrogen, $C_1$–$C_{18}$alkyl which is unsubstituted or substituted by cyano, hydroxy or $C_1$–$C_4$alkoxycarbonyl groups, $C_3$- to $C_{24}$cycloalkyl, $C_1$–$C_4$alkylaryl, $C_6$–$C_{10}$aryl which is unsubstituted or substituted by halogen or $C_1$–$C_4$alkyl or $C_1$–$C_4$alkoxy groups, or a 5- to 7-membered heterocyclic radical, the individual radicals such as alkyl, alkoxy, aryl and the like being as defined above for these radicals, including the preferred ranges defined there. Examples of radicals are: acetylamino, propionylamino, butyrylamino, benzoylamino, p-chlorobenzoylamino, p-methylbenzoylamino, N-methylacetamino, N-methylbenzoylamino, N-succinimido, N-phthalimido or N-(4-amino)phthalimido.

—$NR^{12}COOR^9$ can be those radicals in which $R^9$ and $R^{12}$ are as defined above. Examples of radicals are: —$NHCOOCH_3$, —$NHCOOC_2H_5$ and —$NHCOOC_6H_5$.

—$NR^{12}CONR^{10}R^{11}$ can be those radicals in which $R^{10}$, $R^{11}$ and $R^{12}$ are as defined above. Examples of radicals are: ureido, N-methylureido, N-phenylureido, or N,N'-2',4'-dimethylphenylureido.

—$NHSO_2R^9$ can be those radicals in which $R^9$ is as defined above. Examples of radicals are: methylsulfonylamino, phenylsulfonylamino, p-tolylsulfonylamino or 2-naphthylsulfonylamino.

—$SO_2R^9$ can be those radicals in which $R^9$ is as defined above. Examples of radicals are: methylsulfonyl, ethylsulfonyl, phenylsulfonyl or 2-naphthylsulfonyl.

—$SOR^9$ can be those radicals in which $R^9$ is as defined above. An example of the radical is phenylsulfoxidyl.

—$SO_2OR^9$ can be those radicals in which $R^9$ is as defined above. Examples of the radicals $R^9$ are: methyl, ethyl, phenyl, o-, m-, or p-chlorophenyl, o-, m-, or p-methylphenyl, or 1- or 2-naphthyl.

—$CONR^{10}R^{11}$ can be those radicals in which $R^{10}$ and $R^{11}$ are as defined above. Examples of radicals are: carbamoyl, N-methylcarbamoyl, N-ethylcarbamoyl, N-phenylcarbamoyl, N,N-dimethylcarbamoyl, N-methyl-N-phenylcarbamoyl, N-1-naphthylcarbamoyl or N-piperidylcarbamoyl.

—$SO_2NR^{10}R^{11}$ can be those radicals in which $R^{10}$ and $R^{11}$ are as defined above. Examples of radicals are: sulfamoyl, N-methylsulfamoyl, N-ethylsulfamoyl, N-phenylsulfamoyl, N-methyl-N-phenylsulfamoyl or N-morpholylsulfamoyl.

—$N=NR^{14}$ can be those radicals in which $R^{14}$ is the radical of a coupling component or a phenyl radical which is unsubstituted or substituted by halogen, alkyl or —O-alkyl, where halogen and alkyl are as defined above. Alkyl in the definitions of $R^{14}$ can have one of the numbers of C atoms defined above as preferred. Examples of $R^{14}$ are: the acetoacetarylide, pyrazolyl, pyridonyl, o-, p-hydroxyphenyl, o-hydroxynaphthyl, p-aminophenyl or p-N,N-dimethylaminophenyl radicals.

—$OCOR^9$ can be those radicals in which $R^9$ is as defined above. Examples of the radicals $R^9$ are: methyl, ethyl, phenyl, o-, m- or p-chlorophenyl.

—$OCONHR^9$ can be those radicals in which $R^9$ is as defined above. Examples of the radicals $R^9$ are: methyl, ethyl, phenyl, o-, m- or p-chlorophenyl.

A preferred embodiment relates to symmetrically substituted oxindigo derivatives 1 and 2. In this connection, symmetrically substituted means that (a) an even number of identical substituents is present (i.e. two, four, six or eight) and (b) that a pendant corresponding to a substituent at position X exists at position X'. Examples are oxindigo derivatives 1 and 2 having the same substituents as radicals $R_1$ and $R_2$ and/or $R_3$ and $R_4$ and/or $R_5$ and $R_6$ and/or $R_7$ and $R_8$.

Particularly preferred symmetrically substituted compounds 1 and 2 are those having two (identical) substituents. Examples are compounds 1 and 2 having the same substituents as radicals $R_1$ and $R_2$ or $R_3$ and $R_4$ or $R_5$ and $R_6$ or $R_7$ and $R_8$.

Especially preferred symmetrically substituted compounds 1 and 2 are those which are substituted by identical substituents in positions 6 and 6', i.e. $R_1$=$R_2$. Examples are oxindigo compounds 1 and 2 disubstituted in the 6,6'-position by —$NR^{10}R^{11}$.

The claimed compounds can be prepared analogously to the methods described in the abovementioned cited documents of the prior art, or in analogy to the methods described below in detail for the preparation of in 6- and 6'-position with the —$NR^{10}R^{11}$ disubstituted oxindigo compounds 1 and 2. In this context it is also referred to the dissertation document of Barbara Wagner, Munich 1995.

A preferred embodiment relates to the oxindigo compounds 1 and 2 disubstituted in the 6,6'-position by —NR$^{10}$R$^{11}$, in which R$^{10}$ and R$^{11}$ are as defined above for these radicals, including the preferred embodiments. Particularly preferred 6,6'-diamino-oxindigos 1 and 2 are 6-dimethylamino-2-(6-dimethylamino-3-oxo-2(3H)-benzofuranylidene)-3(2H)-benzofuranone, 6-diethylamino-2-(6-diethylamino-3-oxo-2(3H)-benzofuranylidene)-3(2H)-benzofuranone, 6-di-n-propylamino-2-(6-di-n-propylamino-3-oxo-2(3H)-benzofuranylidene)-3(2H)-benzofuranone, 6-di-n-butylamino-2-(6-di-n-butylamino-3-oxo-2(3H)-benzofuranylidene)-3(2H)-benzofuranone, 6-di-n-pentylamino-2-(6-di-n-pentylamino-3-oxo-2(3H)-benzofuranylidene)-3(2H)-benzofuranone, 6-di-n-hexylamino-2-(6-di-n-hexylamino-3-oxo-2(3H)-benzofuranylidene)-3(2H)-benzofuranone, 6-di-n-octylamino-2-(6-di-n-octylamino-3-oxo-2(3H)-benzofuranylidene)-3(2H)-benzofuranone, 6-di-n-dodecylamino-2-(6-di-n-dodecylamino-3-oxo-2(3H)-benzofuranylidene)-3(2H)-benzofuranone, in each case in their cis and trans or Z and E configurations, and (E)-6-N-methyl-N'-(2'-methylphenyl)-amino-2-(6-N-methyl-N'-(2'-methylphenyl)-amino-3-oxo-2(3H)-benzofuranylidene-3 (2H)-benzofuranone, (Z)- and (E)-6-N-(2'-methylphenyl)-amino-2-(6-N-(2'-methylphenyl)-amino-3-oxo-2(3H)-benzofuranylidene-3(2H)-benzofuranone and (Z)- and (E)-Δ11,11'(2H,3H,4H, 6H,7H,8H,10H,2'H,3'H,4'H,6'H,7'H, 8'H,10'H)-bibenzo[i,j]furo[3,2-g]quinoline10,10'-dione.

Another preferred embodiment relates to the preparation of the oxindigo compounds 1 and 2 in each case disubstituted in the 6- and 6'-position by the radical —NR$^{10}$R$^{11}$.

A particularly preferred process relates to the preparation of the oxindigo derivatives 1 and 2 with radicals —NR$^{10}$R$^{11}$ as substituents in the 6- and 6'-position, which comprises (a) alkylating 3-aminophenols 3

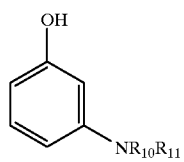

3 with a haloacetic acid alkyl ester, a haloacetic acid or a haloacid chloride in the presence of a base, (b) treating the alkylation product from stage (a) with a base or an acid in the presence of oxygen in a second reaction step, and (c) thereafter working up the resulting reaction mixture by methods known per se, preferably column chromatography.

The compounds 3 are known or can be prepared by methods such as are described in J.Am.Chem.Soc. 74 (1952) 573 starting from 3-aminophenol (R$^{10}$=R$^{11}$=hydrogen).

In a first reaction step, the phenolic OH group is preferably alkylated with a haloacetic acid alkyl ester, preferably a C$_1$–C$_4$alkyl ester, such as methyl chloroacetate, methyl bromoacetate, ethyl chloroacetate, ethyl bromoacetate, -n- or i-propyl chloroacetate, n- or i-propyl bromoacetate, n-, i-, sec- or tert-butyl chloroacetate or n-, i-, sec- or tert-butyl bromoacetate, a haloacetic acid, such as chloroacetic and bromoacetic acid, alkali metal salts thereof, in particular sodium salts thereof, or a haloacid chloride, such as chloroacetyl chloride, methyl chloroacetate being particularly preferred. If desired, preferably if chloroacetyl chloride is used, Lewis acids, such as FeCl$_3$, POCl$_3$ and PCl$_3$ or mixtures thereof, can be added to the acetic acid derivatives mentioned.

The alkylation is usually carried out in the presence of a base to give the compound 4

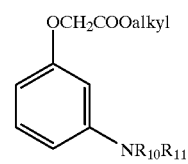

4

The base employed can be an amide, particularly sterically hindered amides, such as lithium piperididyl, and lithium diisopropylamide ("LDA"), preferably LDA, an alkali metal hydroxide, such as NaOH or KOH, preferably KOH, an alkali metal alcoholate, such as NaOMe, or NaH, KH, diazabicycloundecen ("DBU"), or diazabicyclononen ("DBN").

The reaction of 3 to give 4 is preferably carried out in the presence of a solvent, such as an aromatic solvent, such as toluene, benzene, xylol, preferably toluene, in particular if LDA is used, dimethyl sulfoxide ("DMSO"), in particular if solid KOH is used, as well as HMPA, DEU, and DMPU.

The molar ratio of alkylating reagent to compound 3 is usually chosen in the range from 5:1 to 0.5:1, preferably from 1.5:1 to 1:1.

The molar ratio of alkylating reagent to base is usually chosen in the range from 8:1 to 1:1, preferably from 4:1 to 1:1.

If a solvent is used, the weight ratio of solvent to base is in the range from 50:1 to 1:1, preferably from 30:1 to 5:1.

The alkylation is usually carried out at a temperature in the range from –90 to 150, preferably from –78 to 60° C. The pressure is in general chosen in the range from 80 to 120 kPa, and atmospheric pressure is preferably used. The pressure range can also be chosen outside the customary range, depending on the temperature chosen.

As a rule, the duration of the reaction is chosen according to the temperature chosen, and is preferably in the range from 0.5 to 100, particularly 1 to 20 hours.

The compound 4 can be worked by customary methods. In a preferred embodiment, however, the working up step is omitted and the reaction continued.

In a second synthesis step, the compound 4 prepared either by the method described or by another process, in isolated form or in the reaction mixture, is reached with a base or an acid to give the compound 6, a coumaranone, and if a base is used the enolate 5 of the compound 4 can, if desired, be isolated

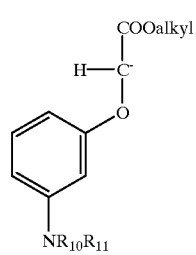

5

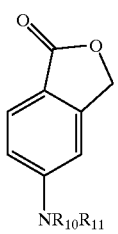

The base employed is in general an amide, such as a non-nucleophilic amide such as lithium piperididyl and LDA, preferably LDA, an alkaline earth metal carbonate, such as CaCO₃, an aluminum oxide, such as γ-Al₂O₃, preferably in basic form, and silica gel, preferably in basic form, for example by treatment with an alcoholate, such as NaOMe and NaOEt.

The acid employed can be the customary mineral acids, such as sulfuric acid and hydrochloric acid, preferably sulfuric acid, and polyphosphoric acid.

The molar ratio of compound 4 to the base or acid is usually chosen in the range from 10:1 to 0.8:1, preferably from 5:1 to 1:1.

If desired, the cyclization to give the coumaranone 6 is carried out in a solvent, such as a polar organic solvent like 1,2-dichloro ethane, 1,2-dichloro methane, nitrobenzene, or inorganic acids such as conc. sulfuric acid and hydrofluoric acid (waterfree), or in carbon disulfide, preferably in 1,2-dichloro ethane.

The cyclization is usually carried out at a temperature in the range from 0 to 200, preferably from 20 to 110° C. The pressure is in general chosen in the range from 80 to 120 kPa, and atmospheric pressure is preferably used. The pressure range can also be chosen outside the customary range, depending on the temperature chosen.

As a rule, the duration of the reaction is chosen according to the temperature chosen, and is preferably in the range from 1 to 16 hours.

The compound 6 can be worked up by methods which are customary per se.

According to previous observations, the coumaranone 6 readily dimerizes with atmospheric oxygen to give the oxindigo derivatives 1 and/or 2. In a preferred embodiment, working up of the coumaranone 6 is therefore omitted and the reaction to give the oxindigo derivatives 1 and/or 2 is continued by carrying out the reaction step defined above, or in particular the last reaction step, in the presence of oxygen, preferably in the presence of air.

The oxindigo derivatives 1 and/or 2 can as a rule be isolated from the reaction mixtures by methods known per se. They are separated off by chromatography, silica gel or aluminum oxide preferably being chosen, particularly preferably silica gel, and chloroform advantageously being chosen as the eluting agent.

Further preferred syntheses of the oxindigos 1 and 2 starting from the compound 3 using the reagents defined are carried out with the following combinations:

(a) reaction of 3-aminophenol 3 with one of the haloacetic acid derivatives defined above and solid KOH in DMSO and cyclization with a second mole of base, such as LDA;

(b) reaction of 3-aminophenol 3 with chloroacetic acid or sodium chloroacetate and KOH in water and a subsequent reaction in sulfuric acid;

(c) reaction of 3-aminophenol 3 first with chloroacetic or sodium chloroacetate and KOH in water and then with calcium carbonate;

(d) reaction of 3-aminophenol 3 with chloroacetic acid or sodium chloroacetate and γ-aluminium oxide, preferably basic aluminium oxide;

(e) reaction of 3-aminophenol 3 with chloroacetic acid or sodium chloroacetate and basic silica gel (sodium ethanolate);

(f) reaction of 3-aminophenol 3 with 1. sodium methanolate, 2. ethyl chloroacetate, and 3. polyphosphoric acid in the presence of air;

(g) as for (f), but with exclusion of air;

(h) reaction of 3-aminophenol 3 with chloroacetic acid, silica gel and chloroform or sodium chloroacetate (simple reaction, in particular in the case of short alkyl chains of 3);

(i) reaction of 3-aminophenol 3 with bromoacetyl chloride, FeCl₃, POCl₃ and PCl₃ or with bromoacetyl chloride, POCl₃ and PCl₃;

(j) reaction of 3-aminophenol 3 with sodium chloroacetate and FeCl₃, POCl₃ and PCl₃;

In another preferred embodiment, 6,6'-dimethoxy-trans-oxindigo, which is known, can be prepared by one of the novel synthesis routes described above in a few steps starting from 3-methoxyphenol.

Another preferred embodiment relates to the preparation of the oxindigo derivatives 1 and/or 2 starting from coumaranone 6. The reaction conditions usually correspond to the conditions defined above for reaction step 6—>½. In this case, the coumaranone 6 can be synthesized by the synthesis steps defined above, starting from one of the precursors or intermediates 3 or 4, and isolated, or can be prepared by another process.

Another preferred embodiment relates to the preparation of the oxindigo derivatives 1 and/or 2 starting from the ester compound 4 via coumaranone 6. A particularly preferred process for the preparation of the oxindigo derivatives 1 and 2 with radicals —NR¹⁰R¹¹ as substituents in the 6- and 6' position comprises (a) treating the ester compound 4

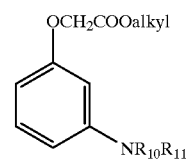

with a base or an acid in the presence of oxygen, or (b) carrying out the treatment by thermolysis at elevated temperature, preferably at a temperature in the range from 80 to 200° C., for 0.5 to 3 hours, and then working up the particular resulting reaction mixture by methods known per se, preferably column chromatography.

The reaction conditions for (a) are usually the conditions defined above for the reaction sequence 4—>6—>½, coumaranone 6 preferably not being isolated. In this case, the ester 4 can be prepared by the synthesis steps defined above, starting from aminophenol 3, or by another process.

According to variant (b), the oxindigo derivatives 1 and/or 2 are obtained by thermolysis of the compound 4, preferably starting from 3-aminophenoxyacetic acid $C_1$–$C_6$alkyl esters, such as methyl 3-aminophenoxyacetate, ethyl 3-aminophenoxyacetate, n-propyl 3-aminophenoxyacetate, n-butyl 3-aminophenoxyacetate, tert-butyl 3-aminophenoxyacetate, n-pentyl 3-aminophenoxyacetate and n-hexyl 3-aminophenoxyacetate, particularly preferably methyl 3-aminophenoxyacetate, at elevated temperature, preferably at a temperature in the range from 80 to 200, particularly preferably from 110 to 150, in particular at 130° C. The residence time here is as a rule chosen in the range from 0.5 to 3 hours, preferably from 0.5 to 1.5 hours, depending on the choice of temperature.

As a rule, in the preparation of donor-substituted oxindigos 1, i.e. oxindigos 1 substituted by the group —NR$^{10}$R$^{11}$, the cis-oxindigo derivative 2 is also obtained. At high reaction temperatures, the contents thereof are in general low, but the content of cis-oxindigo 2 can also be up to about 50% at low reaction temperatures. The cis form 2 can usually be separated completely from the trans form 1 by chromatography, which is preferably carried out carefully.

For preparative preparation of the (cis)-oxindigo derivatives 2, in another preferred embodiment the more readily accessible (trans-)oxindigo derivative 1 can be reduced to the leuco form 7 and oxidized again, preferably at a low temperature. In general, mixtures of the two forms are obtained here in a molar ratio in the range from 0.8:1 to 1.2:1.

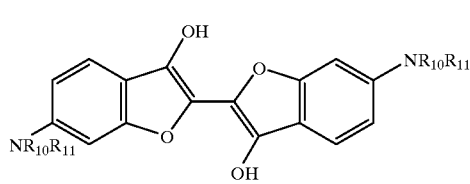

The reduction of the oxindigo derivative 1 is usually carried out here in a polar medium such as water or glacial acetic acid.

The reducing agent which can be employed usually is a common reducing agent such as sodium dithionate, zinc in glacial acetic acid or hydrosulfite (sodium formaldehyde sulfoxylate-hydrate), preferably zinc in glacial acetic acid.

The molar ratio of reducing agent to oxindigo derivative 1 is usually chosen in the range from 500:1 to 3:1, preferably from 20:1 to 3:1.

The reduction is preferably carried out in a solvent, such as water or glacial acetic acid, particularly preferably glacial acetic acid.

The reduction is in general carried out at a temperature in the range from 20 to 150, preferably from 50 to 120° C.

The oxidation of the leuco-oxindigo 7 is usually carried out here with air, pure oxygen, hydrogen peroxide or hypochlorite.

The oxidation of the leuco-oxindigo 7 is in general carried out at a temperature in the range from 0 to 150, preferably from 15 to 40° C.

Another preferred embodiment of the present invention therefore relates to leuco-oxindigo derivatives of the formula 7 and their preparation as described above.

In another preferred embodiment, the cis-oxindigo derivative 2 can be isomerized thermally or photochemically into the corresponding trans form.

The thermal isomerization is usually carried out in a solvent such as alkanols having from 1 to 4 carbon atoms like methanol, ethanol, propanol or butanol, or an aromatic solvent like toluene. Generally, water will enhance the reaction velocity.

The photochemical isomerization is usually carried out with the light of the sun or with common mercury vapor lamps like the Philips HPlc 125 W-lamp.

Another embodiment relates to the conversion of cis-oxindigo derivatives 2 into trans-oxindigo derivatives 1 and vice versa by a reaction catalysed by Lewis acids, such as silica gel, zinc chloride, zinc acetate, iron(III)chloride, the etherate of boron trifluoride. Instead of the Lewis acids mentioned, it is possible to use other substances which have a nucleophilic action, such as a water-alcohol solution. The conversion is usually carried out in a mixture like pyridine/water, 2-, or 3-, or 4-picoline/water, acetonitrile/water.

As a rule the lewis acids are used in catalytic amounts such as in the range of from 0.1 to 15, preferably from 8 to 12, particularly preferred 10 mol-% per mole of the oxindigo compound.

Another preferred embodiment relates to oxindigo derivatives 1 which are disubstituted in the 6- and 6'-position by the group NR$^{10}$R$^{11}$, in which R$^{10}$ and R$^{11}$ are chosen such that at least one of these radicals forms at least one further ring with the phenyl ring already present. Fused-on saturated or unsaturated five- and six-membered rings, also with incorporation of the amine nitrogen atom, for example in the form of a carbazole unit, are preferred. In the rigid oxindigo derivatives 1 thus obtained, the donor action of the amine nitrogen atoms is usually increased compared with less rigid derivatives, such as the oxindigo derivatives 1 without fused-on rings, which as a rule also manifests itself in a greater bathochromic shift in the absorption and the fluorescence.

Another embodiment relates to the coumaranones 6 which are substituted in the 6-position by the group —NR$^{10}$R$^{11}$, and their use for the preparation of the corresponding oxindigo derivatives 1 and/or 2. The radicals R$^{10}$ and R$^{11}$ are as defined above for these radicals, including the preferred embodiments. Another embodiment relates to the preparation of the coumaranones 6 starting from the 3-aminophenol 3 via the ester 4 or directly starting from the ester 4 by the synthesis defined above.

Another embodiment relates to the esters 4 which are substituted in the 3-position by the group —NR$^{10}$R$^{11}$ and their use for the preparation of the corresponding oxindigo derivatives 1 and/or 2 and coumaranones 6. The radicals R$^{10}$ and R$^{11}$ are as defined above for these radicals, including the preferred embodiments. Another embodiment relates to the preparation of the esters 4 starting from the 3-aminophenol 3 by the synthesis defined above.

Another embodiment relates to the 3-aminophenols 3 which are substituted in the 3-position by the group —NR$^{10}$R$^{11}$ and their use for the preparation of the corresponding oxindigo derivatives 1 and/or 2, coumaranones 6 and esters 4. The radicals R$^{10}$ and R$^{11}$ are as defied above for these radicals, including the preferred embodiments. Particularly preferred 3-aminophenols are N,N'-di-n-propyl-3-aminophenol, N,N'-di-n-butyl-3-aminophenol, N,N'-di-n-pentyl-3-aminophenol, N,N'-di-n-hexyl-3-amino-phenol, N,N'-n-octyl-3-aminophenol, N,N'-di-n-dodecyl-3-aminophenol and N-methyl-N'-(2'-methylphenyl)-3-aminophenol.

Another preferred embodiment relates to (Z)- and (E)-Δ11,11'(2H, 3H, 4H, 6H, 7H, 8H, 10H, 2'H, 3'H, 4'H, 6'H, 7'H, 8'H, 10'H)-bibenzo[i,j]furo[3,2-g]quinoline-10,10'-dione and its preparation. The preparation is preferably carried out analogously to the reaction of the 3-aminophenols defined above with a base and an alkylating reagent with subsequent cyclization and dimerization. 8-Hydroxy-2,3,6,7-tetrahydro-1H,5H-benzo[i,j]quinoline—obtainable by the method described in J. Am. Chem. Soc. 86 (1964), 2533—is preferably reacted with a base, such as sodium methylate, and a C$_2$ unit, as the alkylating reagent, such as methyl chloroacetate, preferably in the presence of a Lewis acid, such as silica gel. Working up can be carried out by methods known per se, preferably by chromatography.

Another preferred embodiment relates to a process for vat dyeing of natural substances, such as paper, wood, straw, leather and hides, natural fibre materials, such as cotton, wool, silk, jute, sisal, hemp, flax and animal hair (for example horsehair) and conversion products thereof, such as viscose fibres, nitrate silk or cuprammonium rayon (rayon).

The oxindigo derivatives 1 and/or 2 are preferably vatted with hydrosulfite by methods known per se, such as are described, for example, in "Prakitscher Leitfaden zum Färben von Textilfasern in Laboratorien" [Practical guideline for dyeing textile fibres in laboratories], Julius Springer Verlag, Berlin 1930. In the case of oxindigo derivatives 1 and/or 2 disubstituted in the 6,6'-position by —$NR^{10}R^{11}$ radicals, clear, yellow vats with a blue fluorescence can usually be prepared in this way, and, for example, cotton can be dyed red with these. The re-oxidation, advantageously in air, can be assisted by addition of hydrogen peroxide. Another preferred embodiment relates to the reduction of an oxindigo 1 and/or 2 with zinc in boiling glacial acetic acid. As a rule, dark yellow solutions with a blue fluorescence are obtained here with oxindigo derivatives 1 and/or 2 disubstituted in the 6,6'-position by —$NR^{10}R^{11}$ radicals. Dyeing using cotton is usually achieved with these by atmospheric oxidation. If trans-6-dimethylamino-2-(6-dimethylamino-3-oxo-2(3H)-benzofuranylidene)-3(2H)-benzofuranonee, for example, is used, the corresponding blue cis-isomer is preferentially obtained in the re-oxidation.

It is advantageous that the oxindigo derivatives 1 and 2 according to the invention have an outstanding fluorescence. Furthermore the oxindigo derivatives 1 and 2, in particular the cis-isomers 2, according to the invention are very light-fast as solids. The fluorescences of the oxindigo derivatives 1 and 2 in the solid state furthermore extend far into the near infrared (NIR) region, which renders them particularly interesting for industrial applications.

The wide spectral separation between absorption and fluorescence is important in particular, for example, for laser applications. The solubility of the oxindigo derivatives 1 and 2 assists these applications in a positive manner.

The oxindigo derivatives 1 and 2 according to the invention, including the compounds excluded there are the oxindigo derivatives obtainable by the process according to the invention, are suitable for use as colorants, in particular as pigments and dyes, by methods which as a rule are in each case known per se, preferably (a) for bulk dyeing of polymers, it being possible for the polymer employed to be polyvinyl chloride, cellulose acetate, polycarbonates, polyamides, polyurethanes, polyimides, polybenzimidazoles, melamine resins, silicones, polyesters, polyethers, polystyrene, polymethyl methacrylate, polyethylene, polypropylene, polyvinyl acetate, polyacrylonitrile, polybutadiene, polychlorobutadiene or polyisoprene and the copolymers of the monomers mentioned;

(b) as vat dyes, for example for dyeing natural substances and, in particular, paper, wood, straw, leather, hides or natural fibre materials, such as cotton, wool, silk, jute, sisal, hemp, flax or animal hair (for example horsehair) and conversion products thereof, such as the viscose fibres, nitrate silk or cuprammonium rayon (rayon);

(c) for the preparation of varnishes, paints, especially automotive finishes, coating materials, paper colours, printing inks, inks, in particular for use in ink-jet printers, preferably in homogeneous solution as a fluorescent ink, and for painting and writing purposes, as well as in electrophotography, for example for dry copier systems (Xerox process) and laser printers;

(d) for security marking purposes, such as for cheques, cheque cards, currency notes, coupons, documents, identity papers and the like, in which a special, unmistakeable colour impression is to be achieved;

(e) as an additive to colorants, such as pigments and dyes, in which a certain colour shade is to be achieved, luminous colour shades being preferred in particular;

(f) for marking objects for machine recognition of these objects via the fluorescence; machine recognition of objects for sorting, for example including the recycling of plastics, where alphanumeric prints or barcodes are preferably employed, is preferred;

(g) for conversion of the frequency of light, for example for obtaining longer wavelength visible light from short wavelength light or for doubling the frequency and tripling the frequency of laser light in non-linear optics;

(h) for production of passive display elements for many types of display, notice and marking purposes, for example passive display elements and notices and traffic signs, such as traffic lights;

(i) as a starting material for supraconducting organic materials; (π-π-interaction, and the addition of iodine usually leads intermediary to the delocalization of the charge)

(j) for marking with fluorescence in the solid state;

(k) for decorative and artistic purposes;

(l) for tracer purposes, for example in biochemistry, medicine, technology and natural science, where the colorants according to the invention can be linked covalently to substrates or via secondary valences, such as hydrogen bonds or hydrophobic interactions (adsorption);

(m) as fluorescence dyes in highly sensitive detection processes (cf. C. Aubert, J. Fünfschilling, I. Zschokke-Gränacher and H. Langhals, Z. Analyt. Chem. 1985, 320, 361), in particular as fluorescence dyes in scintillators;

(n) as dyes or fluorescence dyes in optical light collection systems, in fluorescence solar collectors (cf. H. Langhals, Nachr. Chem. Tech. Lab. 1980, 28, 716), in fluorescence-activated displays (cf. W. Greubel and G. Baur, Elektronik 1977, 26, 6), in cold light sources for light-induced polymerization for the preparation of plastics, for testing of materials, for example in the production of semiconductor circuits, for analysis of microstructures of integrated semiconductor components, in photoconductors, in photographic processes, in display, illumination or image converter systems, in which excitation takes place by electrons, ions or UV radiation, for example in fluorescent displays, cathode ray tubes or in fluorescent lamps, as part of an integrated semiconductor circuit, containing the dyes as such or in combination with other semiconductors, for example in the form of an epitaxy, in chemiluminescence systems, for example in chemiluminescent flashlights, in luminescence immunoassays or other luminescence detection processes, as signal paints, preferably for visually emphasizing strokes of writing and drawings or other graphic products, for marking signs and other objects for which a particular visual colour impression is to be achieved, in dye lasers, preferably as fluorescent dyes for generating laser beams;

(o) as optical storage medium by achieving a cis-trans conversion photochemically.

EXAMPLES (A) Preparation of the starting compounds 3 and 4

EXAMPLE 1

N,N'-Di-n-propyl-3-aminophenol (3c)

8.0 g (72 mmol) of 3-aminophenol are dissolved in 100 ml of 96 per cent ethanol, and 12.2 g (71.8 mmol) of 1-iodopropane are added. The reaction mixture is heated to the boiling point and, after 3 hours, a further 12.2 g (71.8 mmol) of 1-iodopropane are added in portions. Boiling under reflux is continued for 12 hours. The pale yellow reaction mixture is then poured into 300 ml of water and rendered basic with $Na_2CO_3$. The mixture is then extracted with chloroform. The chloroform phase is washed with $H_2O$ and finally dried over $MgSO_4$. After the chloroform has been stripped off, a brown, highly viscous liquid which subsequently darkens in light is obtained.

Yield 5.5 g (40.0%) of crude product, $R_f$ ($CHCl_3$)=0.25.

IR (KBr): n=3354 $cm^{-1}$ (s, OH), 2961 (s, CH aliph.), 2934 (s, CH aliph.), 2874 (s, CH aliph.), 1618 (s, C=C), 1580 (s), 1468 (m), 1397 (w), 1378 (m), 1378 (m), 1366 (m), 1300 (w), 1258 (w), 1202 (s), 1171 (m), 1146 (m), 1102 (w), 1012 (m), 820 (w), 752 (m), 688 (m).

EXAMPLE 2

N,N'-Di-n-butyl-3-aminophenol (3d)

8.3 g (45 mmol) of 1-iodobutane are introduced into a solution of 5.0 g (45 mmol) of 3-aminophenol in 200 ml of 96 per cent ethanol and this mixture is boiled under reflux. After 3 hours, 8.3 g (45 mmol) of 1-iodobutane are added dropwise to the hot solution. The reaction mixture is boiled under reflux for a further 24 hours and then introduced into 300 ml of water. $Na_2CO_3$ is added to the solution until a pH of 8 is established. The mixture is then extracted three times by shaking with 70 ml of chloroform each time. The combined organic phases are extracted by shaking first twice with 50 ml of 0.02 N NaOH each time and then twice with 30 ml of water each time. The chloroform phase is dried over $MgSO_4$. After the solvent has been stripped off, a dark brown highly viscous liquid which subsequently darkens in light is obtained.

Yield 2.4 g (19%) of crude product, $R_f$ ($CHCl_3$)=0.32.

IR (KBr): n=3399 $cm^{-1}$ (s, OH), 2958 (S, CH aliph.), 2935 (s, CH aliph.), 2873 (m, CH aliph.), 1618 (s, C=C), 1580 (m), 1504 (s), 1467 (m), 1455 (m), 1401 (w), 1367 (m), 1292 (w), 1241 (w), 1194 (m), 1171 (m), 1145 (w), 1111 (w), 1026 (w), 945 (w), 822 (w), 752 (m), 988 (m).

EXAMPLE 3

N,N'-Di-n-pentyl-3-aminophenol (3e)

35.8 g (180 mmol) of 1-iodopentane are added to a solution of 20.0 g (180 mmol) of 3-aminophenol in 200 ml of 96 per cent ethanol and the mixture is heated to the boiling point. After 3 hours, a further 5.8 g (180 mmol) of 1-iodopentane are added in portions to the boiling hot reaction solution through the reflux condenser. After boiling under reflux for 15 hours, the dark yellow reaction mixture is poured into 400 ml of water, and $Na_2CO_3$ is added until no further foaming occurs. The solution is then extracted three times with 90 ml of chloroform each time. The organic phases are collected and washed twice with 100 ml of 0.02 N NaOH each time and then twice with 70 ml of water each time. The chloroform phase is dried over $MgSO_4$. After the solvent has been stripped off on a rotary evaporator, a brown, light-sensitive viscous liquid is obtained.

Yield 18.8 g (41.9%), $R_f$ ($CHCl_3$)=0.42.

IR (KBr): n=3338 $cm^{-1}$ (w br., OH), 2956 (s, CH aliph.), 2932 (s, CH aliph.), 2871 (m, CH aliph.), 2860 (m, CH aliph.), 1619 (s, C=C), 1580 (s), 1503 (s), 1467 (m), 1369 (m), 1278 (w), 1230 (m), 1188 (m), 1170 (m), 1144 (m), 752 (m), 689 (m).

$C_{16}H_{27}NO$: Calculated 249.2093, found 249.2247 (MS).

EXAMPLE 4

N,N'-Di-n-hexyl-3-aminophenol (3f)

5.7 ml (38 mmol) of 1-iodohexane are added to 4.00 g (0.036 mol) of 3-aminophenol in 80 ml of 96 per cent ethanol and the mixture is boiled under reflux. After 4 hours, a further 5.7 ml (38 mmol) of 1-iodohexane are added in portions. After boiling under reflux for 24 hours, the reaction mixture is introduced into 250 ml of water and brought to pH of 8 with $Na_2CO_3$. It is then extracted twice with 60 ml of chloroform each time. The organic phase is washed with water and dried over $MgSO_4$. After the solvent has been stripped off on a rotary evaporator, a pale brown, light-sensitive viscous liquid is obtained.

Yield 4.4 g (45%), $R_f$ ($CHCl_3$)=0.59.

IR (KBr): n=3322 $cm^{-1}$ (s br., OH), 2957 (s, CH aliph.), 2929 (s, CH aliph.), 2868 (s, CH aliph.), 2858 (s, CH aliph.), 1617 (s, C=C), 1505 (s), 1467 (m), 1378 (w), 1340 (w), 1281 (w), 1218 (m), 1173 (m), 995 (w), 832 (w), 755 (w), 725 (w), 689 (m).

$C_{18}H_{31}NO$: Calculated 277.2406, found 277.2232 (MS).

EXAMPLE 5

N,N'-Di-n-octyl-3-aminophenol (3g)

5.0 g (0.05 mmol) of 3-aminophenol are dissolved in 100 ml of 96 per cent ethanol, and 10.8 g (44.9 mmol) of 1-iodooctane are added. After boiling under reflux for 4 hours, a further 10.8 g (44.9 mmol) of 1-iodooctane are added dropwise and the mixture is boiled under reflux for a further 24 hours. The pale yellow reaction mixture is then introduced into 300 ml of water and $Na_2CO_3$ is added until no further foaming occurs. The reaction mixture is extracted twice with 70 ml of chloroform each time. The organic phase is extracted by shaking twice with 50 ml of 0.02 N NaOH each time and then washed twice with water. The chloroform phase is dried over $MgSO_4$. After the solvent has been stripped off, a brown viscous liquid which subsequently darkens in light is obtained.

Yield 5.69 g (38.0%), $R_f$ ($CHCl_3$)=0.60.

IR (KBr): n=3301 $cm^{-1}$ (m br., OH), 2952 (s, CH aliph.), 2926 (s, CH aliph.), 2854 (s, CH aliph.), 1615 (s, C=C), 1580 (m), 1503 (s), 1467 (m), 1405 (w), 1370 (m), 1279 (m), 1244 (m), 1223 (w), 1167 (m), 1142 (w), 1020 (w), 828 (w), 822 (w), 752 (w), 725 (w), 690 (w).

$C_{22}H_{39}NO$: Calculated 333.3032, found 333.3152 (MS).

EXAMPLE 6

N,N'-Di-n-dodecyl-3-aminophenol (3h)

5.0 g (45 mmol) of 3-aminophenol are dissolved in 100 ml of 96 per cent ethanol. After addition of 13.3 g (45.0 mmol) of 1-iodododecane, the reaction mixture is boiled under reflux for 3 hours. 13.3 g (45.0 mmol) of 1-iodododecane are then added and boiling under reflux is continued for 12 hours. After addition of 350 ml of water, the dark yellow reaction mixture is rendered basic with $Na_2CO_3$. The reaction solution is extracted with a total of 150 ml of chloroform. The chloroform phase is extracted by shaking twice with 70 ml of 0.02 N NaOH each time and then washed twice with water. The organic phase is dried over $MgSO_4$. After the chloroform has been stripped off on a rotary evaporator, a pale brown, light-sensitive viscous liquid is obtained.

Yield 7.4 g (37%), $R_f$ ($CHCl_3$)=0.61.

IR (KBr): n=3328 $cm^{-1}$ (m br., OH), 2956 (s, CH aliph.), 2923 (s, CH aliph.), 2854 (s, CH aliph.), 1615 (s, C=C), 1580 (m, C=C), 1504 (s), 1467 (s), 1455 (m), 1435 (w), 1401 (w), 1370 (m), 1284 (w), 1191 (w), 1163 (m), 1000 (w), 868 (w), 753 (w), 745 (w), 689 (w).

$C_{30}H_{35}NO$: Calculated 445.4284, found 445.4388 (MS).

EXAMPLE 7

N-Methyl-N'-(2'-methylphenyl-3-aminophenol (3i)

15.0 g (74.0 mmol) of 3-hydroxy-2'-methyl-diphenylamine are dissolved in 200 ml of 96 per cent ethanol. 21.2 g (150 mmol) of iodomethane are added to the dark brown solution. After the mixture has been boiled under reflux for 24 hours, 500 ml of water are added, and $Na_2CO_3$ is added until the solution no longer foams. It is then extracted with chloroform. The organic phase is dried over $MgSO_4$. After the solvent has been stripped off, a dark brown, highly viscous liquid is obtained.

Yield 6.4 g (41%), $R_f$ ($CHCl_3$)=0.45.

IR (KBr): n=3387$^{cm-1}$ (s br., OH), 3074 (m, CH arom.), 3030 (m, CH arom.), 2955 (m, CH aliph.), 2933 (m, CH aliph.), 2820 (w, CH aliph.), 1620 (s, C=C), 1596 (s, C=C), 1582 (s, C=C), 1495 (s), 1471 (m), 1461 (m), 1455 (m), 1351 (m), 1270 (m), 1193 (m), 1164 (m), 1139 (w), 1113 (m), 1044 (w), 995 (w), 965 (w), 835 (w), 761 (m), 729 (m), 690 (m).

EXAMPLE 8

8-Methoxy-2,3,6,7-tetrahydro-1H,5H-benzo[i,j]quinoline (Intermediate for 3l)

The reaction is carried out in a three-necked flask with a reflux condenser. An extractor is connected between the reaction vessel and reflux condenser. The extractor is provided with an extraction shell filled with molecular sieve 4 Å. 63.6 g (0.600 mol) of $Na_2CO_3$, 18.5 g (0.170 mol) of m-anisidine and 354.2 g (2.250 mol) of 1-bromo-3-chloropropane are mixed in the reaction vessel. The reaction mixture is slowly heated (70° C./1 hour, 100° C./2 hours, 160° C./12 hours), while stirring vigorously. During this procedure, the reaction mixture changes colour from initially pale yellow to yellow-orange. After cooling, 150 ml of concentrated HCl are added dropwise in the course of 15 minutes, while cooling with ice. A yellowish precipitate separates out as a result. The reaction solution is subjected to steam distillation in order to recover excess 1-bromo-3-chloro-propane. 20 per cent NaOH is added to the distillation receiver until a pH of 8 is established. The aqueous basic reaction solution is extracted three times with 90 ml of ether each time. The combined ether phases are washed with 100 ml of water and then extracted by shaking twice with 100 ml of 2 N HCl each time. The aqueous acid phase is rendered basic with 10 per cent NaOH (pH=8) and then extracted three times with ether (3×70 ml). The combined ether phases are washed with 10 per cent NaOH (3×50 ml) and dried over $Na_2SO_4$. After the desiccant has been filtered off, 32.1 g of oily red-brown crude product (95%) are obtained. For purification, the crude product is chromatographed over a column (300×40 mm) using chloroform as the mobile phase. After the solvent has been stripped off, a slightly oily, red-brown liquid is obtained.

Yield 26 g (85%) [Literature: 56% of purified product], $R_f$ ($CHCl_3$)=0.84.

IR (KBr): n=3500 $^{cm-1}$ (w), 2936 (s, CH aliph.), 2837 (s, OCH3), 2773 (m, CH aliph.), 1606 (s, C=C), 1585 (s, C=C), 1492 (s), 1464 (s), 1444 (s), 1354 (m), 1335 (m), 1308 (s), 1268 (m), 1250 (s), 1198 (s), 1185 (s), 1161 (s), 1132 (s), 1062 (s), 1042 (m), 773 (s).

EXAMPLE 9

8-Hydroxy-2,3,6,7-tetrahydro-1H,5H-benzo[i,j]quinoline (3l)

110 ml (602 mmol) of 48 per cent HI are added to 8.12 g (39.9 mmol) of 8-methoxy-2,3,6,7-tetrahydro-1H,5H-benzo[i,j]quinoline. The reaction mixture is heated to the reflux (4 hours at 110° C.), while stirring. After cooling, the dark brown clear reaction solution is poured onto 800 ml of water, a yellow-green precipitate separating out as a result, this dissolving again on heating. After filtration, a clear, yellow solution is obtained and is brought to a pH of 8 by addition of 2 N $NH_3$. A colourless precipitate separates out as a result. The aqueous phase is extracted with ether (3×80 ml) and the combined ether phases are dried over $MgSO_4$. After the desiccant has been filtered off and the ether has been stripped off on a rotary evaporator, a red-brown solid is obtained. For purification, the crude product is chromatographed twice over a column (300×40 mm) using chloroform as the mobile phase. After the chloroform has been stripped off on a rotary evaporator, a red-brown solid is obtained and is dried over silica gel in a desiccator.

Yield 4.2 g (56%), melting point 121–123° C., $R_f$ ($CHCl_3$)=0.80.

UV ($CHCl_3$): $\delta_{max}$=365.4 nm, 501.3 sh, 617.5.

(B) General working instructions for the preparation of 6,6'-donor-substituted oxindigo derivatives The entire reaction is carried out with exclusion of moisture in an apparatus which has been heated thoroughly.

EXAMPLE 10

0.1 mol of N,N'-dialkyl-3-aminophenol are dissolved in 500 ml of toluene and the solution is cooled to −78° C. 55 ml of a 2 molar lithium diisopropylamide (LDA) solution in cyclohexane/toluene/tetrahydrofuran are added dropwise in the course of 1 hour, while stirring vigorously. This phenolate solution is then introduced dropwise into a solution of 0.11 mol of methyl chloroacetate in 500 ml of toluene in the course of 1 hour. After stirring for 3 hours, 55 ml of the above LDA solution are cautiously added dropwise to the reaction solution at −78° C. The reaction mixture is kept at this temperature for 3 hours, before it is heated slowly to 60° C. After about 12 hours, the reaction mixture is poured into 2 l of water, the pH is brought to 6 with 2 N HCl and the mixture is extracted by shaking three times with 200 ml of chloroform each time. The organic phase is washed first several times with 100 ml of 2 N HCl each time and finally with water, where it should be noted that the wash water must no longer give a basic reaction and should be colourless. If the wash water still gives a basic reaction, the treatment with aqueous HCl is repeated. The chloroform phase is then dried over $MgSO_4$. After the solvent has been stripped off on a rotary evaporator, the crude product is obtained, this comprising the two colorant isomers. This isomer mixture can be separated by working up by column chromatography over silica gel using chloroform and toluene as the mobile phase.

EXAMPLE 11

6-Dimethylamino-2-(6-dimethylamino-3-oxo-2(3H)-benzofuranylidene)-3(2H)-benzofuranone (1b+2b)

7.00 g (50.7 mmol) of anhydrous potassium carbonate and 10.00 g (70.70 mmol) of 3-dimethylaminophenol are added to 75 ml of dimethylformamide with exclusion of moisture and the mixture is refluxed for 3 hours. 7.00 g (74.9 mmol) of sodium chloroacetate are introduced in portions into the dark brown, still hot reaction mixture in the course of 20 minutes, with vigorous stirring. 50 g of anhydrous aluminium oxide are then introduced into the solution. After boiling under reflux for 2 days, the red-brown reaction mixture is filtered through a frit (G4 frit). The dark red aluminium oxide precipitate is washed with chloroform until the wash solution remains colourless. The organic phases are combined. After the solvent has been stripped off, a dark red-brown highly viscous residue remains which is chromatographed over silica gel using chloroform as the mobile phase for separation into the cis and trans product.

EXAMPLE 12

(E)-6-Dimethylamino-2-(6-dimethylamino-3-oxo-2(3H)-benzofuranylidene)-3(2H)-benzofuranone (1b)

An intensely red-coloured solution is obtained in the first running of the separation of the crude product mixture by column chromatography and the colorant is isolated from this as a dark red-brown solid, after filtering through a G4 frit and stripping off the solvent. The colorant is dried under an oil pump vacuum at 90° C. for 7 hours.

Yield 310 mg (2.5%), melting point >320° C., $R_f$ (CHCl$_3$)=0.66.

UV (CDCl$_3$): $\delta_{max}(\epsilon)$=307.4 nm (28 666), 315.9 sh (26 169), 511.7 (25 364), 542.2 sh (22 015).

Fluorescence (CDCl$_3$): $\delta_{max}$=602 nm.

EXAMPLE 13

(Z)-6-Dimethylamino-2-(6-dimethylamino-3-oxo-2(3H)-bezofuranylidene)-3(2H)-benzofuranone (2b)

Purification of the crude product mixture by column chromatography gives an intensely royal blue solution, from which the dark blue colorant is obtained by stripping off the chloroform. The colorant is dried under an oil pump vacuum at 90° C. for 7 hours.

Yield 10 mg (0.1%), melting point >300° C., $R_f$(CHCl$_3$)=0.67.

UV (CDCl$_3$): $\delta_{max}$=271.0 nm, 307.9, 595.6 sh, 629.1.

EXAMPLE 14

6-Diethylamino-2-(6-diethylamino-3-oxo-2(3H)-benzofurranylidene)-3(2H)-benzofuranone (1a+2a)

12.1 g (71.0 mmol) of 3-diethylaminophenol are dissolved in 80 ml of absolute ethanol. After addition of 7.67 g (142 mmol) of sodium methylate, the dark brown reaction solution is boiled under reflux for 3 hours. 8.4 g (77 mmol) of methyl chloroacetate are then added dropwise in the course of 1 hour and 32.9 g of silica gel are added. After gentle boiling under reflux for 4 days, the dark red reaction mixture is filtered through a frit (glass frit P4). The dark red silica gel precipitate is washed with chloroform until the wash solution becomes colourless. The combined organic phases are washed three times with 50 ml of water each time and dried over MgSO$_4$. After the solvent has been stripped off, 4.9 g (39%) of dark red crude product are obtained.

EXAMPLE 15

(E)-6-Diethylamino-2-(6-diethylamino-3-oxo-2(3H)-benzofuranylidene)-3(2H)-benzofuranone (1a)

Purification of the crude product mixture by column chromatography over silica gel using chloroform as the mobile phase gives a solution which is intensely red-violet in colour in the first runnings. The colorant is obtained from this, after filtering through a G4 frit and stripping off the solvent, as a dark red solid which is dried under an oil pump vacuum at 90° C. for 8 hours.

Yield 0.98 g (7.0%), melting point 292° C., $R_f$ (CHCl$_3$)=0.70.

UV (CDCl$_3$): $\delta_{max}(\epsilon)$=311.4 nm (34 224), 321.8 (31 886), 523.8 (28 997), 555.2 sh (25 778). Fluorescence (CDCl$_3$): $\delta_{max}$=610 nm.

EXAMPLE 16

(Z)-6-Diethylamino-2-(6-diethylamino-3-oxo-2(3H)-benzofuranylidene-3(2H)-benzofuranone (2a)

An intensely royal blue fraction is obtained from the first runnings by separation of the crude product mixture by column chromatography over silica gel using chloroform as the mobile phase. After filtering through a G4 frit and stripping off the solvent, the cis colorant is isolated as a dark blue solid, which is dried under an oil pump vacuum at 90° C. for 8 hours.

Yield 10 mg (0.1%), melting point 285° C., $R_f$ (CHCl$_3$)=0.73.

UV (CDCl$_3$): $\delta_{max}(\epsilon)$=277.6 nm, 312.5, 609.8 sh, 646.9.

EXAMPLE 17

(E)-6-Di-n-propylamino-2-(6-di-n-propylamino-3-oxo-2(3H)-benzofuranylidene)-3(2H)-benzofuranone (1c)

prepared analogously to example 10:

dark red solid of melting point 285° C., $R_f$(CHCl$_3$)=0.87.

UV (CHCl$_3$): $\delta_{max}(\epsilon)$=313.1 nm (30 878), 322.9 (29 101), 496.2 sh (18 521), 527.3 (26 787), 557.1 sh (24 098).

Fluorescence (CHCl$_3$): $\delta_{max}$=620.8 nm.

EXAMPLE 18

(Z)-6-Di-n-propylamino-2-(6-di-n-propylamino-3-oxo-2(3H)-benzofuranylidene)-3(2H)-benzofuranone (2c)

prepared analogously to example 10:

dark blue solid of melting point 283° C., $R_f$ (CHCl$_3$)=0.90.

UV (CHCl$_3$): $\lambda_{max}(\epsilon)$=275.5 nm, 302.4 sh, 613.7 sh, 651.3.

EXAMPLE 19

(E)-6-Di-n-butylamino-2-(6-di-n-butylamino-3-oxo-2(3H)-benzofuranylidene)-3(2H)-benzofuranone (1d)

prepared analogously to example 10:

Melting point 216.1° C., $R_f$(CHCl$_3$)=0.89.

UV (CHCl$_3$): $\lambda_{max}(\epsilon)$=312.7 nm (34 125), 325.5 (32 710), 495.5 sh (19967), 527.4 (29 005).

Fluorescence (CHCl$_3$): $\lambda_{max}$=619.1 nm.

EXAMPLE 20

(Z)-6-Di-n-butylamino-2-(6-di-n-butylamino-3-oxo-2(3H)-benzofuranylidene)-3(2H)-benzofuranone (2d)

prepared analogously to example 10:

Melting point 214.2° C., $R_f$(CHCl$_3$)=0.92.

UV (CHCl$_3$): $\lambda_{max}(\epsilon)$=287.7 nm, 306.7 sh, 552.6 sh, 617.8 sh, 652.1.

EXAMPLE 21

6-Di-n-pentylamino-2-(6-di-n-pentylamino-3-oxo-2(3H)-benzofuranylidene)-3(2H)-benzofuranone (1e+2e)

29 ml (58 mmol) of a 2 molar LDA solution in cyclohexane/toluene/tetrahydrofuran are added dropwise to a solution of 14.0 g (56.1 mmol) of N,N'-di-n-pentylaminophenol in 100 ml of toluene in the course of 20 minutes, while cooling with ice and stirring vigorously. The reaction solution is then stirred at room temperature for 1 hour, before being added dropwise to a solution of 5.1 ml (58 mmol) of methyl chloroacetate in 100 ml of toluene in the course of 30 minutes, with exclusion of moisture. After stirring at 60° C. for 12 hours, a further 29 ml (58 mmol) of the above LDA solution are added dropwise to the reaction solution in the course of 15 minutes. The reaction mixture is stirred at 60° C. for a further 12 hours and then introduced into 400 ml of water, the pH is brought to 6 with 2 N HCl and the mixture is extracted by shaking three times with 80 ml of chloroform each time. The organic phase is washed first several times with 50 ml of 2 N HCl each time and then with water, where it should be noted that the wash water must no longer give a basic reaction and should be colourless. If the wash water still gives a basic reaction, the treatment with aqueous HCl is repeated. The chloroform phase is then dried over $MgSO_4$. After the solvent has been stripped off, 29.6 g (7.43%) of dark red-brown crude product are obtained. The colorant isomer mixture can be obtained as a violet fraction in the first runnings by working up by column chromatography over silica gel using toluene as the mobile phase.

EXAMPLE 22

(E)-6-Di-n-pentylamino-2-(6-di-n-pentylamino-3-oxo-2(3H)-benzofuranylidene)-3(2H)-benzofuranone (1e)

Working up the colorant isomer mixture by column chromatography over silica gel using xylene as the mobile phase gives a red-violet fraction in the first runnings. A dark red colorant is obtained by filtering over a G4 frit and stripping off the solvent, and is washed with a large quantity of n-hexane and then dried under an oil pump vacuum at 110° C. for 8 hours.

Yield 680 mg (4.86%), melting point 163.5° C., $R_f$(toluene)=0.84, $R_f$(CHCl$_3$)=0.91, $R_f$(xylene)=0.68.
UV (CHCl$_3$): $\lambda_{max}(\epsilon)$=315.4 nm (25 407), 508.2 sh (22 646), 524.2 (23 869).
UV (EtOH): $\lambda_{max}(\epsilon)$=309,4 nm (30 992), 317,3 sh (29 019), 524,0 (25 657), 540,0 sh (24 892).
Fluorescence(CHCl$_3$): $\lambda_{max}$=608.1 nm.
Fluorescence(EtOH): $\lambda_{max}$=622 nm sh, 631.6.

EXAMPLE 23

(Z)-6-Di-n-pentylamino-2-(6-di-n-pentylamino-3-oxo-2(3H)-benzofuranylidene)-3(2H)-benzofuranone (2e)

Separation of the colorant isomer mixture by column chromatography over silica gel using xylene as the mobile phase give an intensely blue-coloured fraction in the first runnings. After filtering through a G4 frit and stripping off the solvent, a blue, highly viscous residue is obtained. This is taken up in 100 ml of n-hexane. The dark blue colorant is frozen out of this solution at −17° C. and then filtered off over a frit and washed with n-hexane.

Yield 360 mg (2.57%), melting point 162.8° C., $R_f$(toluene)=0.91, $R_f$(CHCl$_3$)=0.95, $R_f$(xylene)=0.81.
UV (CHCl$_3$): $\lambda_{max}(\epsilon)$=276.7 nm (16 284), 309.5 (13 058), 616.4 sh (27 573), 653.1 (32 280).

EXAMPLE 24

6-Di-n-hexylamino-2-(6-di-n-hexylamino-3-oxo-2(3H)-benzofuranylidene)-3(2H)-benzofuranone (1f+2f)

4.0 g (0.1 mol) of N,N'-di-n-hexyl-3-aminophenol are dissolved in 50 ml of toluene. 7.4 ml (15 mmol) of a 2 molar LDA solution in cyclohexane/toluene/tetrahydrofuran are added dropwise at −17° C. with exclusion of moisture. The reaction mixture is heated to the boiling point and boiled for 3 hours. After cooling, the phenolate solution is added dropwise to a solution of 1.6 g (14 mmol) of methyl chloroacetate in 10 ml of toluene in the course of 30 minutes, with exclusion of moisture. The reaction mixture is stirred at 60° C. for 1 hour, before a further 7.4 ml (15 mmol) of the 2 molar LDA solution are slowly added dropwise, while cooling with ice. Finally, the mixture is heated to the boiling point and boiled under reflux for 12 hours. The dark red-brown reaction solution is then introduced into 400 ml of water and neutralized with half-concentrated HCl and the mixture is extracted with chloroform. The organic phase is washed several times with water and finally dried over $MgSO_4$. After the chloroform has been removed on a rotary evaporator, 2.2 g of dark red-brown, highly viscous residue are obtained. A violet fraction which comprises the cis and trans colorant is isolated from the crude product in the first runnings by separation by column chromatography over silica gel using chloroform as the mobile phase. After the solvent has been stripped off, 0.5 g of a red-violet solid is obtained.

EXAMPLE 25

(E)-6-Di-n-hexylamino-2-(6-di-n-hexylamino-3-oxo-2(3H)-benzofuranylidene)-3(2H)-benzofuranone (1f)

The isomer mixture is separated by column chromatography over silica gel using toluene as the mobile phase, the trans-isomer being obtained as a red-violet fraction in the first runnings. This solution is filtered and the solvent is stripped off on a rotary evaporator. The resulting dark red precipitate is dried under an oil pump vacuum at 100° C. for 7 hours.

Yield 0.40 g (8.8%), Melting point 117.1° C., $R_f$(toluene)=0.95, $R_f$(CHCl$_3$)=0.89.
UV (CHCl$_3$): $\lambda_{max}(\epsilon)$=311.7 nm (29 518), 324.9 (27 695), 528.1 (25 111), 555.3 sh (22668).
Fluorescence(CHCl$_3$): $\lambda_{max}$=617.9 nm.

EXAMPLE 26

(Z)-6-Di-n-hexylamino-2-(6-di-n-hexylamino-3-oxo-2(3H)-benzofuranylidene)-3(2H)-benzofuranone (2f)

A blue fraction is obtained from the isomer mixture in the first runnings by separation by column chromatography over silica gel using toluene as the mobile phase. The solution is filtered over a G4 frit. The solvent is distilled off and the resulting blue, highly viscous residue is taken up in 500 ml of n-hexane, from which the cis-isomer separates out at −17° C., this being filtered off and washed with n-hexane.

$R_f$(toluene): 0.98, $R_f$(CHCl$_3$): 0.98.
UV (CHCl$_3$): $\lambda_{max}(\epsilon)$=300.6 nm, 612.3 sh, 652.0.

EXAMPLE 27

6-Di-n-octylamino-2-(6-di-n-octylamino-3-oxo-2(3H)-benzofuranylidene)-3(2H)-benzofuranone (1g+2g)

7.5 ml (15 mmol) of a 2 molar LDA solution in cyclohexane/toluene/tetrahydrofuran are added dropwise to a solution of 5.0 g (0.02 mol) of N, N'-di-n-octyl-3-aminophenol in 50 ml of toluene at −17° C., with exclusion of moisture and vigorous stirring. The reaction solution is healed to the boiling point and boiled under reflux for 4 hours. The cooled solution is slowly added dropwise to a solution of 1.7 g (15 mmol) of methyl chloroacetate in 50 ml of toluene. Finally, a further 7.5 ml (15 mmol) of the 2 molar LDA solution are added dropwise, while cooling with ice. The reaction mixture is stirred at 80° C. for 48 hours and then introduced into 400 ml of water. The solution is neutralized with half-concentrated HCl, while stirring vigorously. The organic phase is separated off and the aqueous solution is extracted by shaking with chloroform. The combined organic phases are washed several times with 2 N HCl and finally with water. If the wash water still gives an alkaline reaction, the treatment with 2 N HCl is repeated. The organic phase is dried over $MgSO_4$. After the solvent has been stripped off on a rotary evaporator, 4.1 g of a dark red-brown, highly viscous crude product are obtained.

EXAMPLE 28

(E)-6-Di-n-octylamino-2-(6-di-n-octylamino-3-oxo-2(3H)-benzofuranylidene)-3(2H)-benzofuranone (1g)

7.5 ml (15 mmol) of a 2 molar LDA solution in cyclohexane/toluene/tetrahydrofuran are added dropwise to a solution of 5.0 g (0.02 mol) of N, N'-di-n-octyl-3-aminophenol in 50 ml of toluene at −17° C., with exclusion of moisture and vigorous stirring. The reaction solution is heated to the boiling point and boiled under reflux for 4 hours. The cooled solution is slowly added dropwise to a solution of 1.7 g (15 mmol) of methyl chloroacetate in 50 ml of toluene. Finally, a further 7.5 ml (15 mmol) of the 2 molar LDA solution are added dropwise, while cooling with ice. The reaction mixture is stirred at 80° C. for 48 hours and then introduced into 400 ml of water. The solution is neutralized with half-concentrated HCl, while stirring vigorously. The organic phase is separated off and the aqueous solution is extracted by shaking with chloroform. The combined organic phases are washed several times with 2 N HCl and finally with water. If the wash water still gives an alkaline reaction, the treatment with 2 N HCl is repeated. The organic phase is dried over $MgSO_4$. After the solvent has been stripped off on a rotary evaporator, 4.1 g of a dark red-brown, highly viscous crude product are obtained.

EXAMPLE 28

(E)-6-Di-n-octylamino-2-(6-di-n-octylamino-3-oxo-2(3H)-benzofuranylidene)-3(2H)-benzofuranone (1g)

The trans colorant is obtained from 4.1 g of the crude product as a red-violet fraction in the first runnings by column chromatography over silica gel using toluene as the mobile phase. After filtering through a G4 frit and stripping off the solvent, the dark red product is dried under an oil pump vacuum at 90° C. for 7 hours.
Yield 0.5 g (9%), melting point 110.2° C., $R_f$(toluene)=0.94, $R_f$(CHCl$_3$)=0.87.
UV (CHCl$_3$): $\lambda_{max}(\epsilon)$=311.8 nm (12958), 327.3(12045), 496.4 sh (7763), 528.8 (11666), 558.7 sh (10487).
Fluorescence(CHCl$_3$): $\lambda_{max}$=615.5 nm.

EXAMPLE 29

(Z)-6-Dioctylamino-2-(6-dioctylamino-3-oxo-2(3H)-benzofuranylidene)-3(2H)-benzofuranone (2g)

4.1 g of the crude product are chromatographed over a silica gel column using toluene as the mobile phase. A blue fraction is separated off in the first runnings, and the solvent is stripped off on a rotary evaporator. The resulting blue, highly viscous residue is taken up in 200 ml n-hexane. The dark blue colorant is frozen out at −17° C., filtered off, washed with n-hexane and dried under an oil pump vacuum at 80° C. for 8 hours.
$R_f$(toluene)=0.97, $R_f$(CHCl$_3$)=0.88, UV (CHCl$_3$): $\lambda_{max}(\epsilon)$=300.6 nm, 613.7 sh, 652.9.

EXAMPLE 30

6-Di-n-dodecylamino-2-(6-di-n-dodecylamino-3-oxo-2(3H)-benzofuranylidene)-3(2H)-benzofuranone (1h+2h)

6.0 g (0.01 mol) of N,N'-di-n-dodecyl-3-aminophenol are dissolved in 50 ml of toluene. 9.0 ml (0.01 mol) of a 1.5 molar LDA solution in toluene are added dropwise in the course of 30 minutes, with exclusion of moisture and while cooling with ice. The reaction solution is stirred while boiling gently for 3 hours. The cooled phenolate solution is added dropwise to a solution of 1.6 g (14 mmol) of methyl chloroacetate in 50 ml of toluene at 60° C. in the course of 30 minutes. 9.0 ml (0.01 mol) of the 1.5 molar LDA solution are then added in portions to the dark brown mixture, while cooling with ice. After stirring at 80° C. for 48 hours, the dark red-brown reaction mixture is poured into 300 ml of water and neutralized with half-concentrated HCl. The organic phase is separated off, while the aqueous phase is extracted by shaking three times with 50 ml of chloroform each time. The collected organic phases are washed several times with 2 N HCl and finally with water. If the wash water still gives an alkaline reaction, the treatment with 2 N HCl is repeated. The organic phase is then dried over $MgSO_4$. The solvent mixture is stripped off on a rotary evaporator. 4.9 g remain of a dark red-brown, highly viscous crude product which comprises the two product isomers.

EXAMPLE 31

(E)-6-Di-n-dodecylamino-2-(6-di-n-dodecylamino-3-oxo-2(3H)-benzofuranylidene)-3(2H)-benzofuranone (1h)

The trans-isomer is obtained as a red-violet fraction in the first runnings by column chromatography of the crude product over silica gel using toluene as the mobile phase. After the solvent has been stripped off on a rotary evaporator, a dark red, highly viscous residue remains, which is taken up in 250 ml of n-hexane. After cooling to −17° C., the trans colorant precipitates out, and is filtered off with suction through a P5 frit, washed with n-hexane and dried under an oil pump vacuum at 70° C. for 7 hours.
Yield 70 mg (1.1%), melting point: 107.2° C., $R_f$(toluene)= 0.98, $R_f$(CHCl$_3$)=0.98.
UV (CHCl$_3$): $\lambda_{max}(\epsilon)$=314.0 nm (31150), 322.7 (28879), 497.0 sh (20750), 527.5 (29247), 559.0 sh (26847).
Fluorescence(CHCl$_3$): $\lambda_{max}$=614.9 nm.

EXAMPLE 32

(Z)-6-Di-n-dodecylamino-2-(6-di-n-dodecylamino-3-oxo-2(3H)-benzofuranylidene)-3(2H)-benzofuranone (2h)

4.9 g of the crude product are chromatographed several times over silica gel using toluene as the mobile phase. The cis colorant is separated off in the first runnings as a blue fraction. After the solvent has been stripped off, the blue, viscous residue which remains is taken up in 100 ml of n-hexane and the dark blue colorant is frozen out at −17° C.

The precipitate is filtered off with suction through a G5 frit, washed with a little cold n-hexane and dried under an oil pump vacuum at 80° C. for 7 hours.
Yield 20 mg (3·10⁻³%), melting point: 105.1° C., $R_f$(toluene): 0.99, $R_f$(CHCl$_3$): 0.99.
UV (CHCl$_3$): $\lambda_{max}(\epsilon)$=279.0 nm (18853), 311.4 (16691), 619.1 sh (34789), 653.4 (41078).

EXAMPLE 33

6-N-(2'-methylphenyl)-amino-2-(6-N-(2'-methylphenyl)-amino-3-oxo-2(3H)-benzofuranylidene)-3(2H)-benzofuranone (1j+2j)

23.0 ml (11.5 mmol) of a 2 molar LDA solution in cyclohexane/toluene/tetrahydrofuran are added dropwise to a solution of 10.0 g (44.2 mmol) of N-(2'-methylphenyl)-3-aminophenol in 50 ml of toluene, while cooling with ice and with exclusion of moisture, and the mixture is then stirred at 80° C. for 3 hours. The cooled phenolate solution is slowly added dropwise to a solution of 5.0 g (45 mmol) of methyl chloroacetate in 50 ml of toluene at room temperature. A further portion of 23.0 ml (11.5 mmol) of the 2 molar LDA solution is then added, while cooling with ice, and the mixture is heated at 80° C. for 48 hours. The cooled dark brown reaction mixture is introduced into 300 ml of water and neutralized with half-concentrated HCl. The organic phase is separated off, the aqueous solution is extracted by shaking twice with chloroform and the combined organic phases are washed several times with water. After drying over MgSO$_4$, the solvent is stripped off on a rotary evaporator. A dark brown, highly viscous residue remains.

EXAMPLE 34

(E)-6-N-(2'-methylphenyl)-amino-2-(6-N-(2'-methylphenyl)-amino-3-oxo-2(3H)-benzofuranylidene)-3(2H)-benzofuranone (1j)

Purification of the crude product mixture by column chromatography over silica gel using toluene as the mobile phase gives a yellow-orange fraction in the first runnings. After the solvent has been stripped off, the dark red, highly viscous residue is taken up in 250 ml of n-hexane. After cooling at −17° C. for 2 days, a dark orange precipitate has separated out. The precipitate is filtered off with suction, washed with a little n-hexane and dried under an oil pump vacuum at 80° C. for 6 hours.
Yield 0.2 g (2%), melting point: 315.1° C., $R_f$(toluene)=0.20, $R_f$(CHCl$_3$)=0.83.
UV (CHCl$_3$): $\lambda_{max}(\epsilon)$=312.7 nm (31211), 488.8 (27034), 514.3 sh (23707).
Fluorescence(CHCl$_3$): $\lambda_{max}$=582.0 nm.

EXAMPLE 35

(Z)-6-N-(2'-methylphenyl)-amino-2-(6-N-(2'-methylphenyl)-amino-3-oxo-2(3H)-benzofuranylidene)-3(2H)-benzofuranone (2j)

The crude product is chromatographed over silica gel using toluene as the mobile phase, a blue fraction being obtained in the first runnings. After the solvent has been stripped off on a rotary evaporator, the dark blue colorant is obtained, and is dried under an oil pump vacuum at 80° C. for 7 hours.
Yield <10 mg (<9.5·10⁻⁵%), melting point: 303–306° C., $R_f$(toluene)=0.4, $R_f$(CHCl$_3$)=0.84.
UV (CHCl$_3$): $\lambda_{max}(\epsilon)$=286.0 nm, 297.9 sh, 362.7 sh, 577.2 sh, 602.

EXAMPLE 36

(E)-6-N-methyl-N'-(2'-methylphenyl)-amino-2-(6-N-methyl-N'-(2'-methylphenyl)-amino-3-oxo-2(3H)-benzofuranylidene)-3(2H)-benzofuranone (1i)

6.0 g (0.03 mol) of N-methyl-N'-(2'-methylphenyl)-3-aminophenol are taken up in 100 ml of toluene, and 15.0 ml (30.0 mmol) of a 2 molar LDA solution in cyclohexane/toluene/tetrahydrofuran are added dropwise at −17° C., with exclusion of moisture. After stirring at 80° C. for 3 hours, the cooled mixture is added dropwise to a solution of 3.2 g (29 mmol) of methyl chloroacetate in 50 ml of toluene in the course of 30 minutes. Finally, a further 15.0 ml (30.0 mmol) of the LDA solution are added in portions at −17° C. The dark brown reaction mixture is stirred at 80° C. for 48 hours and then introduced into 300 ml of water, after cooling. The dark red-brown solution is neutralized with half-concentrated HCl. The organic phase is separated off, while the aqueous solution is extracted with chloroform. The combined organic phases are washed several times with water and dried over MgSO$_4$. After the solvent has been stripped off on a rotary evaporator, a dark red-brown, highly viscous residue remains. Purification by column chromatography over silica gel using toluene as the mobile phase gives a red-orange fraction in the first runnings. After the solvent has been stripped off, the resulting dark red, viscous residue is taken up in 200 ml of n-hexane and the mixture is kept at −17° C. for 2 days. During this procedure, a dark red-orange precipitate separates out, and is filtered off over a frit, washed with a little n-hexane and dried under an oil pump vacuum at 80° C. for 6 hours.
Yield 0.32 g (4.6%), melting point: 221–247° C., $R_f$(toluene)=0.61, $R_f$(CHCl$_3$)=0.93.
UV (CHCl$_3$): $\lambda_{max}(\epsilon)$=309.1 nm (27251), 318.2 (24989), 472.7 sh (14992), 505.1 (22344), 532.3 sh (19643).
Fluorescence(CHCl$_3$): $\lambda_{max}$=591.0 nm.

EXAMPLE 37

Δ11,11'(2H,3H,4H,6H,7H,8H,10H,2'H,3'H,4'H,6'H,7'H,8'H,10'H)-Bibenzo[i,j]furo[3,2-g]quinoline-10,10'-dione (1l+2l)

2.39 g (44.2 mmol) of sodium methylate are added in portions to 4.2 g (22 mmol) of 8-hydroxy-2,3,6,7-tetrahydro-1H,5H-benzo[i,j]quinoline in 100 ml of absolute ethanol. After heating to the boiling point, 2.4 ml (27 mmol) of methyl chloroacetate are slowly added dropwise. 50 ml of silica gel are added, with vigorous stirring, and the brownish suspension is boiled under reflux at 100° C. for 12 hours. The reaction mixture is now significantly reddish, and the pH is 6.5. The silica gel is filtered off with suction by means of a G4 frit and washed with ethanol. The ethanolic solution chiefly comprises unreacted 8-hydroxy-2,3,6,7-tetrahydro-1H,5H-benzo[i,j]quinoline, which is reacted a second and third time as described above. The product is still absorbed on the silica gel. The silica gel from the three batches is collected and extracted with toluene for 12 hours. After the solvent has been stripped off, 0.22 g (4%) of a dark violet needle-shaped solid, a mixture of cis and trans product, is obtained. The isomers are separated over a column (800×40 mm) over silica gel using chloroform as the mobile phase.

EXAMPLE 38

(E)-Δ11,11'(2H,3H,4H,6H,7H,8H,10H,2'H,3'H,4'H,6'H,7'H,8'H,10'H)-Bibenzo[i,j]furo[3,2-g]quinoline-10,10'-dione (1l)

Separation of the crude product (0.22 g) by column chromatography over silica gel using chloroform as the mobile phase gives a dark violet fraction in the first runnings. After the solvent has been stripped off, the trans colorant is obtained as a dark violet solid and is dried under an oil pump vacuum at 100° C. for 6 hours.

Yield 0.2 g (4%), melting point: >360° C., $R_f(CHCl_3)$: 0.63, UV (CHCl$_3$): $\lambda_{max}(\epsilon)$=324.2 nm (18273), 331.3 sh (17846), 549.3 nm (17770), 580.3 sh (15745).
Fluorescence(CHCl$_3$): $\lambda_{max}$=644 nm.

EXAMPLE 39

(Z)-Δ11,11'(2H,3H,4H,6H,7H,8H,10H,2'H,3'H,4'H,6'H,7'H,8'H,10'H)-Bibenzo[i,j]furo[3,2-g]quinoline-10,10'-dione (2l)

0.22 g of crude product is chromatographed over a silica gel column (800×40 mm) using chloroform as the mobile phase. A turquoise blue fraction is obtained in the first runnings, from which the cis colorant is obtained in the form of a dark turquoise blue solid, and is dried under an oil pump vacuum at 100° C. for 6 hours.

Yield 10 mg (2·10$^{-3}$%), melting point: >360° C., $R_f(CHCl_3)$: 0.71.
UV (CHCl$_3$): $\lambda_{max}(\epsilon)$=693.0 nm, 648.8 sh.

(C) Preparation of 6,6'-donor-substituted Oxindigo Derivatives with Lewis Acids

EXAMPLE 40

6-Diethylamino-2-(6-diethylamino-3-oxo-2(3H)-benzofuranylidene)-3(2H)-benzofuranone (1a)

10.0 g (60.5 mmol) of 3-diethylaminophenol are mixed with 12.5 g (90.1 mmol) of bromoacetic acid at a reaction temperature of 60° C., with exclusion of moisture and vigorous stirring with a precision glass stirrer. 7.0 g (46 mmol) of phosphoryl chloride, 6.3 g (46 mmol) of phosphorus trichloride and 24.6 g (152 mmol) of anhydrous iron trichloride are added. After a reaction time of 24 hours, 3 parts of ice are added to the dark violet mixture and the solid mixture is dissolved with cautious heating and stirring. After addition of sodium citrate (as a complexing agent for Fe$^{3+}$-ions), the mixture is extracted by shaking three times with 80 ml of chloroform each time. The dark red organic phase is dried over MgSO$_4$. After the solvent has been stripped off on a rotary evaporator, 55.66 g of dark violet, highly viscous crude product are obtained. 0.7 g of crude product are worked up by column chromatography over silica gel using chloroform as the mobile phase. The trans colorant isomer can be separated off as a red-violet fraction in the first runnings. After the solvent has been stripped off on a rotary evaporator, the resulting dark red solid is dried under an oil pump vacuum at 95° C. for 7 hours.

Yield 0.03 g (19%, based on the total batch), melting point 292° C., $R_f(CHCl_3)$=0.70.

EXAMPLE 41

6-Diethylamino-2-(6-diethylamino-3-oxo-2(3H)-benzofuranylidene)-3(2H)-benzofuranone (1a+2a)

1 g (6 mmol) of 3-diethylamino-phenol is dissolved is 20 ml of chloroform with exclusion of moisture. 1 g (9 mmol) of chloroacetyl chloride is added dropwise in the course of 30 minutes. Silica gel (about 10 g in total) is then introduced until the entire reaction solution has been absorbed, and the mixture is heated at 60–70° C. for 6 days. Finally, the silica gel is filtered off with suction through a G4 frit and washed with chloroform until the wash solution remains colourless. The dark red organic phases are combined and the solvent is stripped off on a rotary evaporator. 0.4 g of a dark red solid is obtained and is subsequently separated into the isomers by column chromatography over silica gel using chloroform as the solvent. The cis-isomer is obtained in the first runnings as a blue fraction, and the trans-isomer is obtained as a red-violet fraction. After the solvents have been stripped off, the resulting colorant isomers are dried at 95° C. under an oil pump vacuum for 7 hours.

| (E)-Isomer (1a) | (Z)-isomer (2a) |
| --- | --- |
| Yield 0.14 g (12%) | Yield 0.01 g (0.84%) |
| Melting point 292° C. | Melting point 285° C. |
| $R_f$ (CHCl$_3$) = 0.70 | $R_f$ (CHCl$_3$) = 0.73 |

0.22 g of N,N'-diethylaminophenol were recovered.

EXAMPLE 42

6-Dimethylamino-2-(6-dimethylamino-3-oxo-2(3)-benzofuranylidene)-3(2H)-benzofuranone (1b)

20 g (15 mmol) of 3-dimethylamino-phenol are dissolved in 40 ml of dry chloroform with exclusion of moisture. 25 ml (30 mmol) of chloroacetyl chloride are added dropwise with vigorous stirring. Silica gel (about 40 g in total) is then added until the reaction solution has been absorbed. The reaction mixture is heated to the boiling point under reflux for 2 days and then left to stand for 2 days. Finally, the silica gel precipitate is filtered off. The precipitate is washed with iso-propanol until the wash solution remains virtually colourless. The dark red organic phases are combined. The solvent mixture is stripped off on a rotary evaporator. The dark red, highly viscous residue which remains is worked up by column chromatography over silica gel using chloroform as the mobile phase. The colorant is separated off as a red solution in the first runnings. After the solvent has been stripped off on a rotary evaporator, the colorant is dried under an oil pump vacuum at 60° C. for 5 hours.

Yield 0.11 g (4.2%), melting point. >320° C., $R_f(CHCl_3)$=0.66.

EXAMPLE 43

6-Di-n-butylamino-2-(6-di-n-butylamino-3-oxo-2(3H)-benzofuranylidene)-3(2H)-benzofuranone (1d)

1.8 g (8.1 mmol) of 3-di-n-butylamino-phenol are dissolved in 20 ml of dry chloroform with exclusion of moisture. 0.7 ml (8.8 mmol) of chloroacetyl chloride is added dropwise with vigorous stirring. Silica gel (about 10 g in total) is then allowed to trickle in until a large proportion of the reaction solution has been absorbed, and the mixture is boiled under reflux for 15 hours. Finally, the solid is filtered off and washed with chloroform until the wash solution remains virtually colourless. The organic phases are combined. After the solvent has been stripped off on a rotary evaporator, 1.4 g of a dark brown, highly viscous crude product are obtained. Working up of the crude product by column chromatography over silica gel using chloroform as the solvent gives the oxindigo colorant as a red-violet fraction in the first runnings. After the chloroform has been stripped off, the resulting colorant is dried under an oil pump vacuum at 75° C. for 5 hours.

Yield 0.04 g (1.9%), melting point 216.1° C., $R_f(CHCl_3)$=0.89.

EXAMPLE 44

6-Diethylamino-2(6-diethylamino-3-oxo-2(3H)-benzofuranylidene)-3(2H)-benzofuranone (1a)

1.0 g (6.0 mmol) of 3-diethylamino-phenol is dissolved in 29 g of absolute ethanol with exclusion of moisture. 10 g of basic aluminium oxide are then allowed to trickle into the solution, with vigorous stirring. 0.7 g (6.0 mmol) of chloroacetyl chloride is added dropwise through an attached reflux condenser. The dark violet reaction mixture is heated to the boiling point under reflux, with vigorous stirring. After 2 hours, 1.0 ml (12 mmol) of chloroacetyl chloride is added dropwise through the reflux condenser. After a further 30 minutes, a further 1.5 ml (18 mmol) of chloroacetyl chloride and 2 g of basic aluminium oxide are added. After 10 minutes, the reaction mixture becomes dark red in colour. The reaction mixture is left to stand at 60–70° C. for 60 hours. Finally, the mixture is filtered with suction through a G4 frit and the solid is washed several times with absolute ethanol until the wash solution is virtually colourless. The dark red organic phases are combined. The ethanol is stripped off on a rotary evaporator. 3 g of a dark red, highly viscous residue are obtained, this being purified by column chromatography over silica gel using chloroform as the mobile phase. The colorant is isolated as a red-violet fraction in the first runnings. After the solvent has been stripped off, the resulting dark red solid is dried under an oil pump vacuum at 95° C. for 5 hours.

Yield 0.01 g (0.92%), melting point 292° C., $R_f(CHCl_3)$=0.70.

EXAMPLE 45

6-Methoxy-2-(6-methoxy-3-oxo-2(3H)-benzofuranylidene)-3(2H)-benzofuranone (1k)

20.0 ml (0.185 mol) of 3-methoxyphenol are mixed with 50 ml of toluene. 100 ml (0.200 mol) of a 2 molar LDA solution in cyclohexane/toluene/tetrahydrofuran are added dropwise in the course of 30 minutes, with exclusion of moisture and vigorous stirring. The reaction temperature is increased slowly to 60° C. After 48 hours, this reaction solution is added dropwise to a solution of 21.8 g (0.210 mol) of methyl chloroacetate at room temperature and with exclusion of moisture in the course of 3 hours. The reaction solution is stirred at 60° C. for 1 hour. It is then cooled to −17° C. and a further 100 ml (0.200 mol) of the 2 molar LDA solution in cyclohexane/toluene/tetrahydrofuran are added dropwise in the course of 1 hour. After heating at 60° C. for 24 hours, a further 10.0 ml (0.096 mol) of methyl chloroacetate and 30 ml of the 2 molar LDA solution are added. The pale brown reaction mixture is stirred at 60° C. for 24 hours and then introduced into 300 ml of water. The basic solution is rendered neutral with half-concentrated HCl and is finally extracted by shaking three times with 80 ml of toluene each time. The organic phases are collected and are washed with about 50 ml of water beforehand, before they are dried with $MgSO_4$. After the solvent has been stripped off on a rotary evaporator, a yellow-brown residue is obtained. Working up several times by column chromatography over silica gel using toluene as the mobile phase gives the colorant as a yellow solution of yellow fluorescence in the first runnings and the intermediate methyl (m-methoxyphenoxy)acetate as a yellow solution of blue fluorescence in the main runnings.

EXAMPLE 46

(E)-6-Methoxy-2-(6-methoxy-3-oxo-2(3H)-benzofuranylidene)-3(2H)-benzofuranone (1k)

The yellow solution of yellow fluorescence obtained in the first runnings by working up by column chromatography over silica gel using toluene as the mobile phase is concentrated on a rotary evaporator until a yellow, highly viscous residue is obtained. This is taken up in 150 ml of an n-hexane/acetone mixture (10:1) and the yellow colorant is frozen out at −17° C. The colorant is then filtered over a frit, washed with n-hexane and dried in a desiccator.

Yield 0.07 g (2,3·10$^{-3}$%), melting point 309.5° C. (Lit.: 310° C.), $R_f$(toluene)=0.74, $R_f$ (CHCl$_3$)=0.76.

UV (CHCl$_3$): $\lambda_{max}(\epsilon)$=272.9 nm, 404.0 (sh), 421.4, 444.9.

Fluorescence (CHCl$_3$): $\lambda_{max}$=475.3 nm, 495.0.

EXAMPLE 47

Methyl (3-methoxyphenoxy)acetate (4k)

In the preparation of 6,6'-dimethoxy-oxindigo (1k), a yellow solution of blue fluorescence is obtained in the so-called main runnings during separation of the reaction mixture by column chromatography. After the solvent has been stripped off, the yellow, highly viscous residue is taken up in 150 ml of an n-hexane/acetone mixture (10:1) and the mixture is kept at a temperature of −17° C. for 12 hours. The intermediate is then separated off as a yellow phase of blue fluorescence by working up by column chromatography over silica gel using toluene as the mobile phase.

Yield 8.6 g (23%), $n_D$=1.5239 (Literature: 1.5229), $R_f$(toluene)=0.65, $R_f$(CHCl$_3$)=0.73.

UV (CHCl$_3$): $\lambda_{max}(\epsilon)$=319.4 nm.

Fluorescence (CHCl$_3$): $\lambda_{max}$=410 nm.

EXAMPLE 48

Methyl (3-diethylaminophenoxy)acetate (4b)

5.0 g (30 mmol) of 3-diethylaminophenol are dissolved in 80 ml dry toluene and cooled down to −78° C. Within 15 min 15 ml of a 2 molar LDA-solution are added. After warming up to room temperature this phenolate solution is added in dropwise to a solution of 2.7 ml (30 mmol) of methyl chloroacetate in 15 ml of dry toluene. The dark brown reaction mixture is stirred at room temperature for 3 hours, after then it is added to 300 ml of water. Then solution is made acidic by adding a little amount of 2 N HCl. Afterwards, the reaction mixture is extracted three times with 80 ml of chloroform each time. The organic phases are collected and are dried with $MgSO_4$. After the drying agent is filtered off, the solvent has been stripped off on a rotary evaporator, a dark brown, highly viscous residue is obtained. Fractional distillation under the reduced atmosphere of an oil pump yields the analytically pure, slightly yellowish, viscous, liquid product, which quickly turns dark brown under the influence of light and air.

$n_D$=1.5379, $R_f$(CHCl$_3$)=0.63.

UV (CHCl$_3$): $\lambda_{max}(\epsilon)$=304.7 nm, 352.9 sh (br.).

Fluorescence (CHCl$_3$): $\lambda_{max}$=450 nm.

EXAMPLE 49

Vatting of 6-diethylamino-2-(6-diethylamino-3-oxo-2(3H)-benzofuranylidene)-3(2H)-benzofuranone (1a)

(a) 70 mg (1.7 mmol) of 1a with hydrosulfite are stirred with 15 ml of water (50° C.). 5 ml of 30 per cent NaOH are added to the dark red suspension (pH=9). 4 g of sodium formaldehyde-sulfoxylate hydrate are sprinkled into the suspension, with vigorous stirring. The stock vat thus obtained is diluted to 30 ml and kept at 50° C. for 30 minutes. The non-reduced dye is then filtered off to give a clear, yellow solution which shows blue fluorescence. This dyeing vat is kept at 50° C. throughout the entire dyeing experiment. The dyeing experiment is carried out in several passes. For this, a cotton fibre is immersed in the vat for about 30 minutes. After removal of the fibre, it is hung for about 30 minutes and the process is repeated once. The resulting cotton fibre is dyed red.

If desired, the re-oxidation can be assisted by using hydrogen peroxide.

(b) 0.10 g of the oxindigo 1a (from Example 14) is dissolved in 40 ml of glacial acetic acid. 1.67 g (25.5 mmol) of zinc powder are introduced into the dark red solution. After the solution has been heated to the boiling point, it gradually becomes yellow in colour. The zinc sediment is filtered off to give a clear, dark yellow solution of blue fluorescence. A cotton ribbon is impregnated in this solution for 15 minutes. Chiefly the blue cis form 2a is then formed by oxidation in the air. During a couple of months in air and sunlight (during days) visually no color change is observed.

TABLE

Spectroscopic properties of the
6,6'-donor-substituted oxindigos 1a–k, 2a–h and 2j

| No. | R$^{a)}$ | cis/trans | Abs.$^{b)}$ | Flu.$^{c)}$ |
|---|---|---|---|---|
| 1a | $(C_2H_5)_2N$ | trans | 523.8 | 610.0 |
| 2a |  | cis | 646.9 |  |
| 1b | $(CH_3)_2N$ | trans | 511.7 | 602.0 |
| 2b |  | cis | 629.1 |  |
| 1c | $(n-C_3H_7)_2N$ | trans | 527.3 | 620.8 |
| 2c |  | cis | 651.3 |  |
| 1d | $(n-C_4H_9)_2N$ | trans | 527.4 | 619.0 |
| 2d |  | cis | 652.1 |  |
| 1e | $(n-C_5H_{11})_2N$ | trans | 524.2 | 608.1 |
| 2e |  | cis | 653.1 |  |
| 1f | $(n-C_6H_{13})_2N$ | trans | 528.1 | 617.9 |
| 2f |  | cis | 652.0 |  |
| 1g | $(n-C_8H_{17})_2N$ | trans | 528.8 | 615.5 |
| 2g |  | cis | 652.9 |  |
| 1h | $(n-C_{12}H_{25})_2N$ | trans | 627.5 | 614.9 |
| 2h |  | cis | 653.4 |  |
| 1i | $2\text{-}CH_3C_6H_4.CH_3N$ | trans | 505.1 | 591.0 |
| 1j | $2\text{-}CH_3C_6H_4.HN$ | trans | 488.8 | 582.0 |
| 2j |  | cis | 602.0 |  |
| 1k | $CH_3O$ | trans | 421.4 | 475.3 |

$^{a)}$Substituent in positions 6 and 6' of 1 and 2.
$^{b)}$Absorption maximum in chloroform solution.
$^{c)}$Fluorescence maximum in chloroform solution; fluorimeter: Perkin Elmer 3000.

What is claimed is:

1. An oxindigo derivative of the general formula 1 or 2

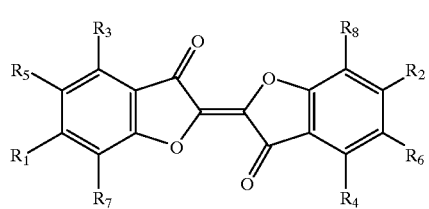

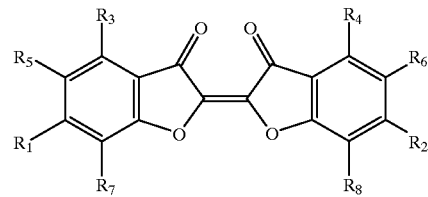

in which four to seven of the radicals $R_1$, $R_2$, $R_3$, $R_4$, $R_5$, $R_6$, $R_7$ and $R_8$ are hydrogen and one to four of radicals $R_1$, $R_2$, $R_3$, $R_4$, $R_5$, $R_6$, $R_7$ and $R_8$ are chosen from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{12}$, —CN, —$NR^{10}R^{11}$, —$COR^9$, —$NR^{13}COR^9$, —$NR^{12}COOR^9$, —$NR^{12}CONR^{10}R^{11}$, —$NHSO_2R^9$, —$SO_2R^9$, —$SO_2OR^9$, —$CONR^{10}R^{11}$, —$SO_2NR^{10}R^{11}$, —N=$NR^{14}$, —$OCOR^9$ and —$OCONHR^9$, wherein two corresponding adjacent radicals can be combined to form a fused-on aromatic rings, in which $R^9$ is $C_1$–$C_{18}$alkyl, $C_6$–$C_{10}$aryl or benzyl which is unsubstituted or substituted by halogen, $C_1$–$C_4$alkyl or $C_1$–$C_4$alkoxy, or a five- to seven-membered heterocyclic radical, $R^{10}$ and $R^{11}$ independently of one another are hydrogen, $C_1$–$C_{18}$alkyl which is unsubstituted or substituted by cyano or hydroxy groups, $C_3$- to $C_{24}$cycloalkyl, $C_6$–$C_{10}$aryl or 5- to 7-membered heteroaryl, or in which $R^{10}$ and $R^{11}$, together with in each case one of the other radicals $R_2$ to $R_4$, form a 5- or 6-membered carbocyclic or heterocyclic ring, $R^{12}$ is hydrogen, $C_1$–$C_{18}$alkyl, $C_3$- to $C_{24}$cycloalkyl, $C_6$–$C_{10}$aryl or 5- to 7-membered heteroaryl, $R^{13}$ is hydrogen, $C_1$–$C_{18}$alkyl which is unsubstituted or substituted by cyano, hydroxy or $C_1$–$C_4$alkoxycarbonyl groups, $C_3$- to $C_{24}$cycloalkyl, $C_1$–$C_4$alkylaryl, $C_6$–$C_{10}$aryl which is unsubstituted or substituted by halogen, $C_1$–$C_4$alkyl- or $C_1$–$C_4$alkoxy groups, or a 5 to 7-membered heterocyclic radical, and $R^{14}$ is the radical of a coupling component or is $C_6$–$C_{10}$aryl which is unsubstituted or substituted by halogen, $C_1$–$C_4$alkyl or $C_1$–$C_4$alkoxy groups, or a mixture of oxindigo derivatives of formulae 1 and 2, with the proviso that in the oxindigo derivative of formula 1 $R_1$ and $R_2$ are not simultaneously methyl or methoxy, or $R_5$ and $R_6$ are not simultaneously chlorine, or $R_1$, $R_2$, $R_3$ and $R_4$ are not simultaneously methyl, or $R_1$, $R_2$, $R_5$, $R_6$, $R_7$ and $R_8$ are not simultaneously methyl, if in each case all the other radicals from the list of $R_1$ to $R_8$ are hydrogen, and with the further proviso that if $R_1$ in the cis-oxindigo derivative of formula 2 is a dimethylamino group, $R_2$ is not simultaneously a hydroxy group.

2. A process for the preparation of an oxindigo derivative according to claim 1, substituted in the 6- and 6'-position by radicals —$NR_{10}R_{11}$ which comprises (a) treating the ester compound of formula 4

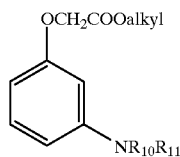
4 with a base or an acid in the presence of oxygen or (b) carrying out the treatment by thermolysis at elevated temperature, and then working up the particular resulting reaction mixture.

3. A leuco oxindigo derivative of the general formula 7

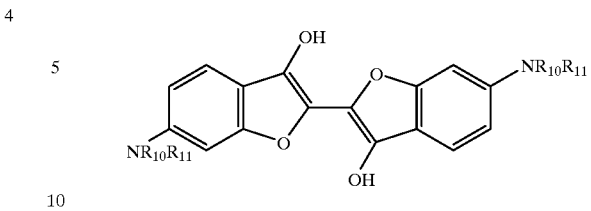
7 wherein $R_{10}$ and $R_{11}$ are as defined in claim 1.

4. (Z)- and/or (E)-Δ11,11'(2H, 3H, 4H, 6H, 7H, 8H, 10H, 2'H, 3'H, 4'H, 6'H, 7'H, 8'H, 10'H)-bibenzo[i,j]furo[3,2-g]quinoline-10,10'-dione.

5. The process according to claim 2, wherein thermolysis is carried out at a temperature in the range from about 80 to about 200° C., for about 0.5 to about 3 hours.

6. The process according to claim 2, wherein said reaction mixture is worked up by column chromatography.

* * * * *

UNITED STATES PATENT AND TRADEMARK OFFICE
CERTIFICATE OF CORRECTION

PATENT NO. : 6,156,914
DATED : December 5, 2000
INVENTOR(S) : Heinz Langhals et al.

It is certified that error appears in the above-identified patent and that said Letters Patent is hereby corrected as shown below:

Title page,
Section [22] should read:
--[22] PCT Filed: Apr. 17, 1997 --

Signed and Sealed this

Tenth Day of July, 2001

*Nicholas P. Godici*

Attest:

Attesting Officer

NICHOLAS P. GODICI
*Acting Director of the United States Patent and Trademark Office*